(12) United States Patent
Mickle et al.

(10) Patent No.: US 7,057,514 B2
(45) Date of Patent: Jun. 6, 2006

(54) ANTENNA ON A WIRELESS UNTETHERED DEVICE SUCH AS A CHIP OR PRINTED CIRCUIT BOARD FOR HARVESTING ENERGY FROM SPACE

(75) Inventors: Marlin H. Mickle, Pittsburgh, PA (US); Christopher C. Capelli, Pittsburgh, PA (US); Harold Swift, Gibsonia, PA (US)

(73) Assignee: University of Pittsburgh - Of the Commonwealth System oif Higher Education, Pittsburgh, PA (US)

( * ) Notice: Subject to any disclaimer, the term of this patent is extended or adjusted under 35 U.S.C. 154(b) by 0 days.

(21) Appl. No.: 10/857,527

(22) Filed: Oct. 5, 2004

(65) Prior Publication Data

US 2005/0030181 A1    Feb. 10, 2005

Related U.S. Application Data

(60) Provisional application No. 60/475,151, filed on Jun. 2, 2003.

(51) Int. Cl.
*G08B 13/14* (2006.01)
(52) U.S. Cl. .............................. 340/572.7; 340/572.4; 343/701; 343/703
(58) Field of Classification Search .............. 340/572.2, 340/572.6, 572.4, 572.7; 343/895, 879, 795, 343/793, 700 MS, 701, 703; 257/491, 678, 257/679, 778
See application file for complete search history.

(56) References Cited

U.S. PATENT DOCUMENTS

| | | | |
|---|---|---|---|
| 4,471,344 A | * | 9/1984 | Williams .................. 340/572.2 |
| 4,724,427 A | | 2/1988 | Carroll |
| 4,857,893 A | | 8/1989 | Carroll |
| 5,296,866 A | | 3/1994 | Sutton |
| 6,054,925 A | * | 4/2000 | Proctor et al. ........... 340/572.7 |
| 6,100,804 A | * | 8/2000 | Brady et al. .............. 340/572.7 |
| 6,177,872 B1 | * | 1/2001 | Kodukula et al. ........ 340/572.7 |
| 6,289,237 B1 | | 9/2001 | Mickle et al. |
| 6,335,686 B1 | * | 1/2002 | Goff et al. ................ 340/572.4 |
| 6,373,447 B1 | * | 4/2002 | Rostoker et al. ............ 343/895 |
| 6,615,074 B1 | | 9/2003 | Mickle et al. |
| 6,856,291 B1 | | 2/2005 | Mickle et al. |

* cited by examiner

*Primary Examiner*—Anh V. La
(74) *Attorney, Agent, or Firm*—Arnold B. Silverman; Philip E. Levy; Eckert Seamans Cherin & Mellott, LLC

(57) ABSTRACT

A wireless untethered device which may be an integrated circuit chip or printed circuit board having at least one integrated antenna and circuitry operatively associated with the antenna for receipt of energy harvested from space by the antenna. The antenna has an effective area greater than its physical area. A system which receives power from the harvested energy after the energy is processed by the circuitry may also be provided with mismatched impedance between the antenna and a circuit resistance.

12 Claims, 40 Drawing Sheets

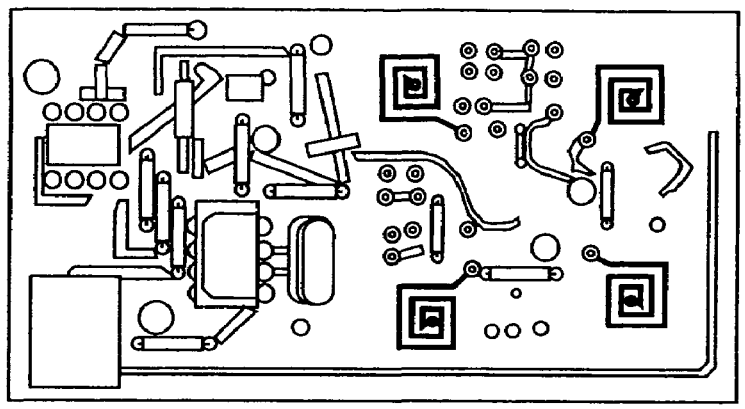
FIG. 1
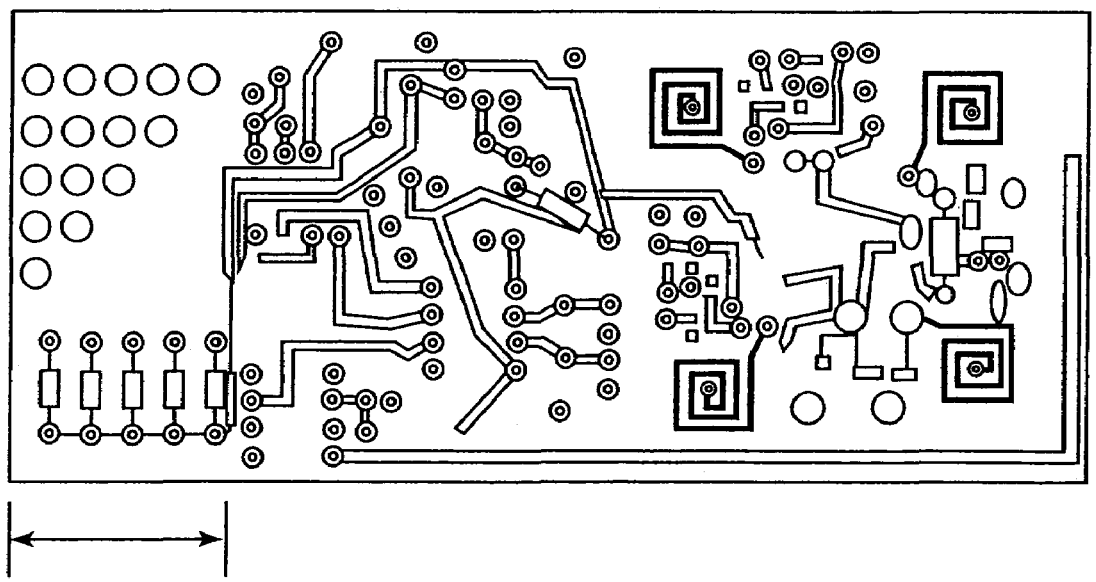
FIG. 2   Power and voltage measurement circuitry

| Number of Measurement | Thickness |
|---|---|
| 1 | 55.1 um |
| 2 | 223 um |
| 3 | 234um |

| Number of Measurement | Thickness |
|---|---|
| 1 | 55.1um |
| 2 | 82.3um |
| 3 | 273um |

Antenna A
(No Ground Plane)

Antenna B
(With Ground Plane)

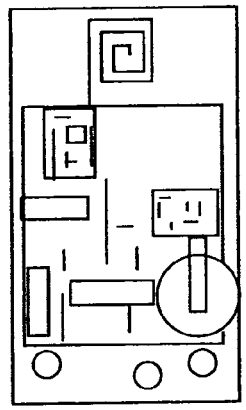
P1
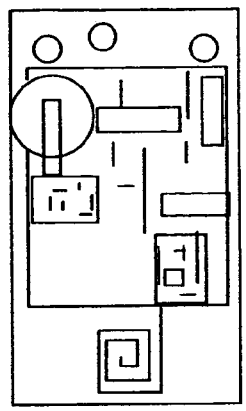
P2
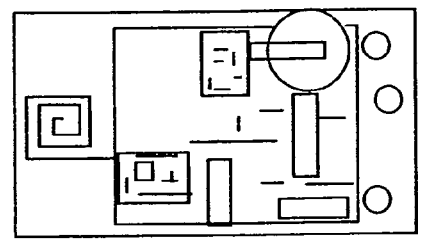
P3
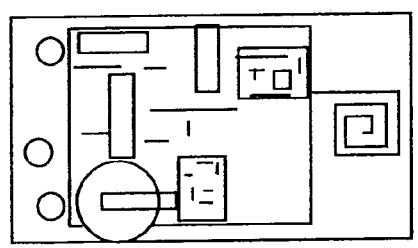
P4
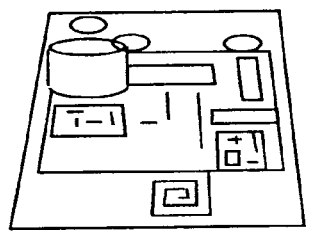
P5
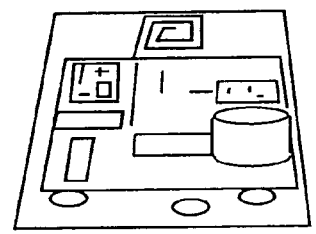
P6
FIG. 27

ANTENNA ON A WIRELESS UNTETHERED DEVICE SUCH AS A CHIP OR PRINTED CIRCUIT BOARD FOR HARVESTING ENERGY FROM SPACE

CROSS-REFERENCE

This application claims the benefit of U.S. Provisional Application Ser. No. 60/475,151 entitled "ANTENNA ON A WIRELESS UNTETHERED DEVICE SUCH AS A CHIP OR PRINTED CIRCUIT BOARD FOR HARVESTING ENERGY FROM SPACE" filed Jun. 2, 2003.

BACKGROUND OF THE INVENTION

1. Field of the Invention

A device is disclosed comprising a semiconductor integrated circuit (IC) chip having disposed on it antenna and the circuitry for the IC chip, wherein antenna and the circuitry of the IC chip are integrated so as to provide the IC chip with an improved antenna effective area. The design of the antenna placement on the chip is independent of the location of the antenna on the chip. As a result, antenna-on-a-chips of this invention are simpler to design and manufacture than the designs disclosed in the prior art. With increasing dependence on local and wide area wireless networks, particularly those with low power (range) requirements and local sensing or object identification, there is a need to have an antenna structure integrated onto single semiconductor devices. One important lack has been an on-chip antenna structure that overcomes simple deficiencies of size.

The length and material of antennas normally determine the frequency and intensity of signals that may be received or sent from the antenna. However with smaller and smaller local area wireless networks being contemplated, the concept of a room sized network area or building area with antennas mounted in walls and ceilings (whether independent separate antennas or multi-use antennas, such as using electrical wiring or telephone wiring as an antenna structure), the feasibility of using very low power antenna structures to transfer information from a local network to a wireless IC device or system containing such wireless IC device becomes practicable.

2. Description of the Prior Art

It has been known to provide antennae and circuitry at specific locations on chips. U.S. Pat. Nos. 4,857,893 and 4,724,427 disclose the use of planar antennas that are included in circuitry of a transponder on a chip. As disclosed therein, the antenna coil is etched around the periphery of the chip substrate. In the center of the antenna coil are found a custom logic circuit, a programmable memory array, and memory control logic. The planar antenna of the transponder was said to employ a magnetic film inductor on the chip in order to allow for a reduction in the number of turns and thereby simplify fabrication of the inductors. It disclosed an antenna having a multi-turned spiral coil and having a 1 cm×1 cm outer diameter. When a high frequency current was passed in the coil, the magnetic films were said to be driven in a hard direction, and the two magnetic films around each conductor served as a magnetic core enclosing a one turn coil. The magnetic films were said to increase the inductance of the coil, in addition to its free-space inductance.

One of the problems with the approach as taught in U.S. Pat. Nos. 4,857,893 and 4,724,427 is the need to fabricate small, air core inductors of sufficiently high inductance and Q for integrated circuit applications. The small air core inductors were said to be made by depositing a permalloy magnetic film or other suitable material having a large magnetic permeability and electric insulating properties in order to increase the inductance L of the coil. Such an approach increases the complexity and cost of the antenna on a chip and also limits the ability to reduce the size of the antenna because of the need for the magnetic film layers between the antenna coils.

Another problem with the approach as taught in U.S. Pat. Nos. 4,857,893 and 4,724,427 is the attendant integrating of an antenna on an integrated circuit (IC) chip. In the case of an antenna disposed about the periphery of the chip, as described by the patents discussed hereinabove, the location of the antenna interferes with conventional bond pad layout about the periphery of the chip. Also, the electromagnetic fields within the central area of an antenna laid out about the periphery of a chip can interfere with the operation of circuits located within the antenna.

U.S. Pat. Nos. 6,373,447 discloses the use of one or more antennas that are formed on an integrated circuit chip connected to other circuitry on the chip. The antenna configurations include loop, multi-turned loop, square spiral, long wired and dipole. The antenna could have two or more segments which could selectively be connected to one another to alter effective length of the antenna. Also, the two antennas are said to be capable of being formed in two different metallization layers separated by an insulating layer.

U.S. Pat. No. 6,373,447 attempts to overcome the problems of U.S. Pat. Nos. 4,857,893 and 4,724,427 by having the antenna formed on other than a peripheral area of an integrated circuit (IC) chip. U.S. Pat. No. 6,373,447 describes devices comprising an integrated circuit (IC) chip having a surface wherein the surface is divided into a peripheral area and a central area. The central area comprises a first portion and a second portion wherein the circuitry of the IC chip is disposed within the first portion of the central area; and an antenna disposed within the second portion of the central area. This patent teaches that one or more antennas can be formed on an integrated circuit chip connected to other circuitry on the chip. The antenna configurations include loop, multi-turned loop, square spiral, long wired and dipole. The antenna could have two or more segments which could selectively be connected to one another to alter the effective length of the antenna.

U.S. Pat. No. 6,373,447 attempts to avoid the problems of the antenna interfering with the conventional bond pad layout about the periphery of the chip by placing the antenna in the central area of the chip. However, in all cases disclosed by the inventor the antenna is located in one portion of the central area, and IC circuitry is disposed on the other portion of the central area. The inventors do state in the body of the patent that the antennas can also be located on "one or two or three (but not four) edges of the chip, so long as there are no bond pads in that area".

A problem with the prior art as discussed above is that disposition of the antenna on the chip is limited to specific different parts of the chip. In the case of U.S. Pat. Nos. 4,857,893 and 4,724,427 the antenna is on the periphery of the chip and in the case of U.S. Pat. No. 6,373,447 the antenna is in the central area of the chip.

A further problem with the antenna on chip designs as disclosed by prior art is that the antenna and IC circuitry are disposed as discrete components in separate portions of the chip to minimize the interaction of the antenna and the circuitry of the IC chip. In the case of U S. Pat. No. 6,373,447, the antenna is one portion of the central area and the IC circuitry is the other portion of the central area. This again limits the design of placing an antenna on a IC chip. Furthermore, it makes for devices that are not truly integrated.

SUMMARY OF THE INVENTION

The present invention provides an integrated circuit chip which has at least one integrated and preferably integrally formed antenna with circuitry operatively associated with the antenna for receipt of energy harvested by the antenna from space. In another embodiment, a printed circuit board or other wireless untethered device is employed. The antenna has an effective area greater than its physical area. A system which receives power from the circuitry generally at DC power resulting from rectification by the circuitry of the energy harvested may also be provided on the chip.

The antenna and circuitry may be positioned at any location on the chip without adversely effecting performance.

The antenna may be a spiral antenna such as a square spiral antenna, with the thickness and width of the conductive portion being adjusted to maximize performance. Impedance may be adjusted to provide for an enhanced effective antenna area.

It is an object of the present invention to provide an integrated antenna on a chip or printed circuit board with associating circuitry to facilitate efficient receipt of energy from space by the antenna and conversion of the same by the circuitry to DC power.

It is a further object of the invention to provide such a semiconductor integrated chip or printed circuit board which will deliver DC power from the circuitry to an electronic system.

It is another object of the present invention to provide such a system which does not require the use of a power storage element or hard wiring.

These and other objects of the invention will be made fully understood from the following description on reference to the appended drawings.

BRIEF DESCRIPTION OF THE DRAWINGS

FIG. 1 illustrates a circuit which is an operational device but has no battery or wires for powering.

FIG. 2 illustrates a circuit of the type shown in FIG. 1 with an associated display to measure the energy harvested.

FIG. 3b is a photograph of the chip represented in FIG. 3a.

FIG. 27 illustrates six antenna orientations.

DESCRIPTION OF THE PREFERRED EMBODIMENTS

Figure 3B:
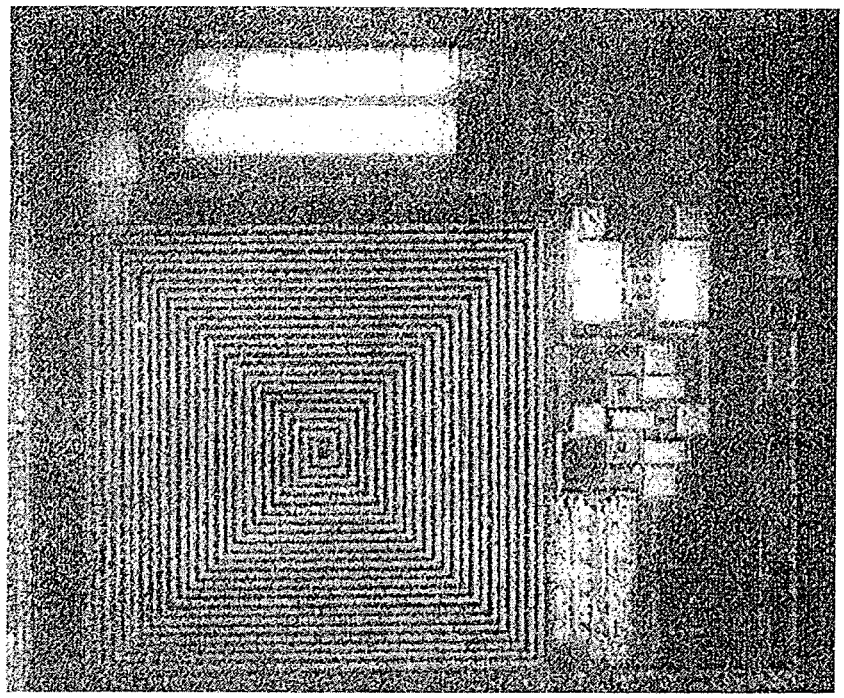

As employed herein, the tern "in space" means that energy or signals are being transmitted through the air or similar medium regardless of whether the transmission is within or partially within an enclosure, as contrasted with transmission of electrical energy by a hard wired or printed circuit boards.

As employed herein the term "wireless untethered device" means a device which is remotely powered by RF energy and shall include, but not be limited to, IC chips, printed circuit boards and other suitable substrates having discrete or integrated circuit components.

What is further needed is an antenna on a chip wherein the antenna is not a discrete component to the IC circuit. In that respect there are two issues; (1) the interference of the received RF energy on the proximate IC circuitry, and (2) the interference of the proximate IC circuitry on the RF energy. While the first issue is important to any functional IC, the separation of the energy harvesting function from the payload IC electronic circuitry, U.S. Pat. No. 6,289,237, discloses isolating the negative effect of the RF from the payload electronics with respect to RF signals as opposed to RF energy. Our experiments have shown that while the payload electronics are in the proximate area of the energy harvesting antenna and associated circuitry, the payload will still function satisfactorily.

The second issue is in fact a benefit to the energy harvesting antenna and adds to the effective area of such an antenna(s). The functional devices for the experiments of the previous paragraph are pictured in FIGS. 1 and 2. In both cases, the proximate circuitry has been demonstrated to operate satisfactorily in an applied RF energy field while simultaneously enhancing the harvested energy through providing additional area to the effective area to the antenna. The ability to obtain a tractable closed form mathematical formula to describe the indicated situation is extremely difficult at best due to the multitude of effects and interactions by the interconnection circuitry and the proximate components themselves.

FIG. 1 illustrates an operational device with all discrete components and conducting traces in place with no battery or wires for powering. The energy is supplied by beaming radio frequency (RF) energy to the device, rectifying the RF and converting it to direct current (DC), and powering electronics to read a temperature sensor and transmit the result to a receiver. The device requires five milliwatts of power to function. This device is functional as illustrated.

FIG. 2 is a device to measure power where the energy harvesting circuitry is the same as the device in FIG. 1, but with five sets of light emitting diodes (LED's) connected in parallel to measure voltage without the need to connect wires to the device energy harvesting circuitry. Relative power can also be estimated by observing the brightness of the LED's. The conductors to interconnect the payload components of FIG. 1 are included in FIG. 2 while the proximate electronic components themselves have been removed.

Figure 3A:
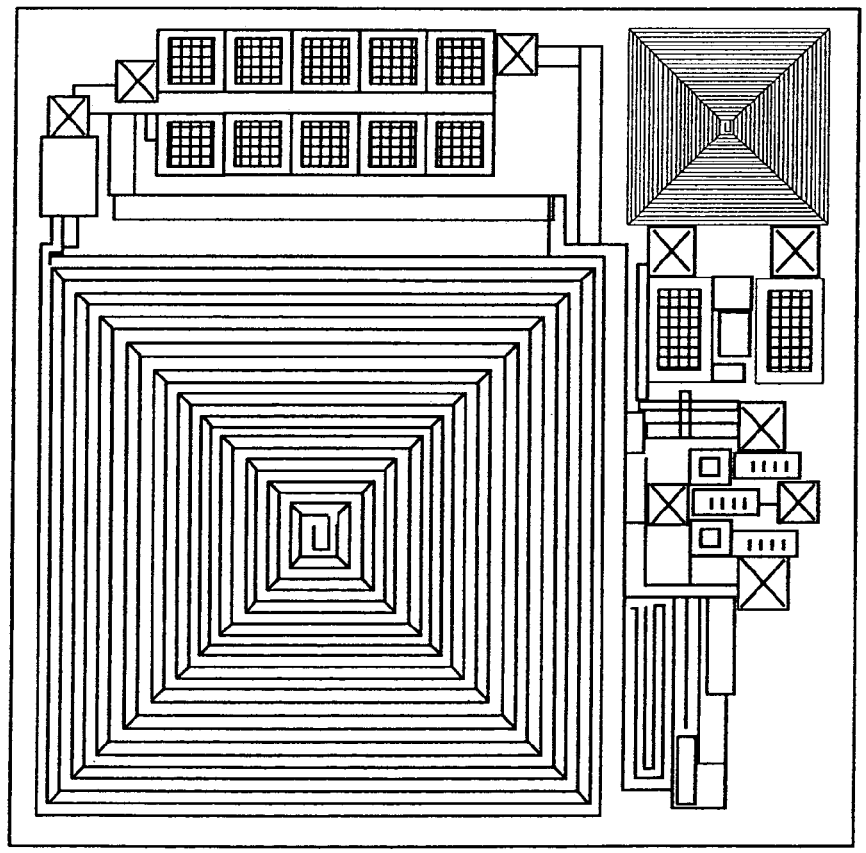
FIG. 3a shows a chip having an on-chip antenna for harvesting data and an on-chip on chip antenna for transmitting data.

FIG. 3 shows a single chip RFID design using an on-chip antenna for energy harvesting and an on-chip antenna for transmitting data. FIG. 3.a. is the "flatten" picture of the layout from the Computer Aided Design (CAD) tool, and FIG. 3.b. is a photograph of the actual fabricated chip (die).

Figure 4A:
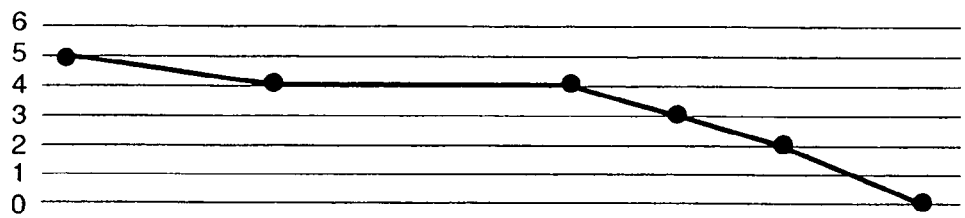
FIGS. 4a and 4b show, respectively, (i) a plot of experimental results and (ii) a circuit and related power measuring device along with a plot of variations in result due to use of a conductive ground plane.
Figure 4B:
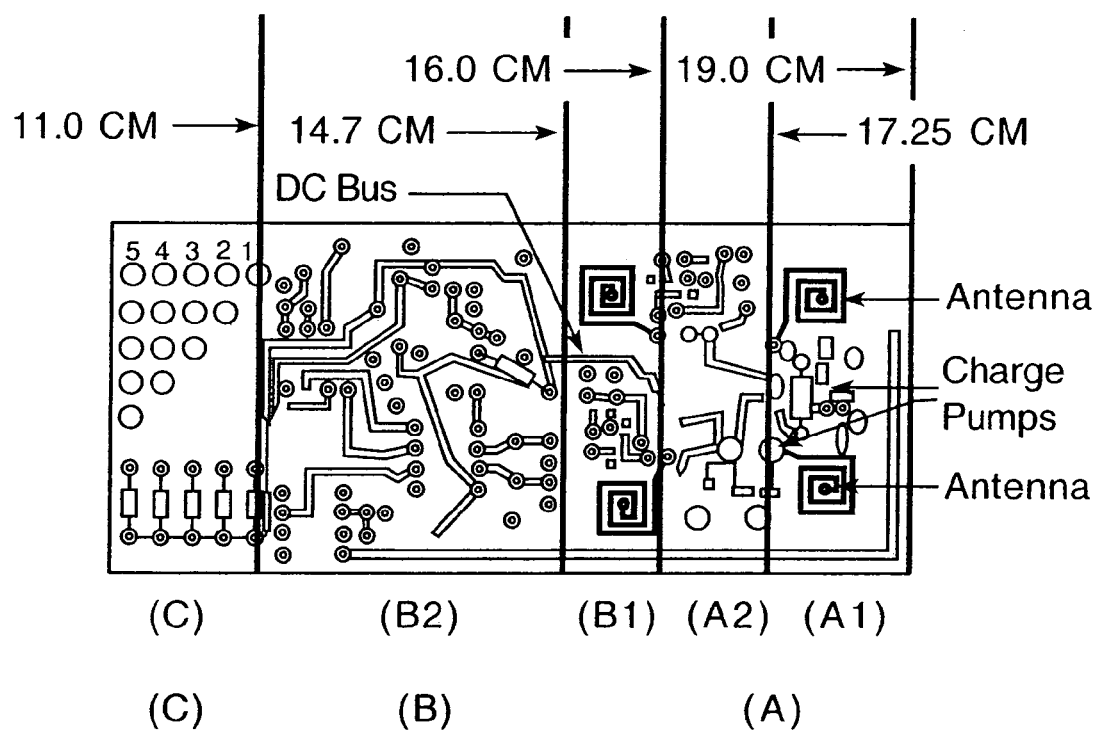
Figure 5A:
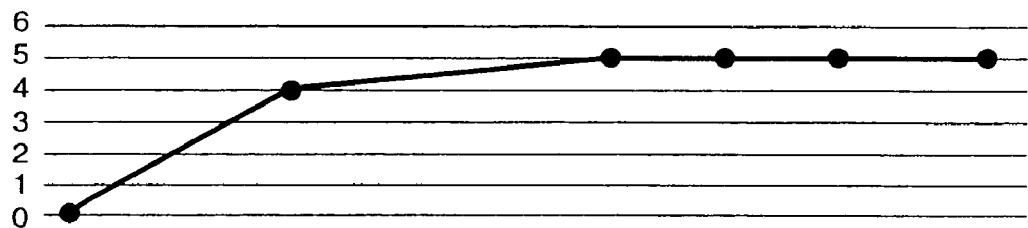
FIGS. 5a and 5b show, respectively, a plot and measurement in a representation of the circuit and power representation of ground plane influence.
Figure 5B:
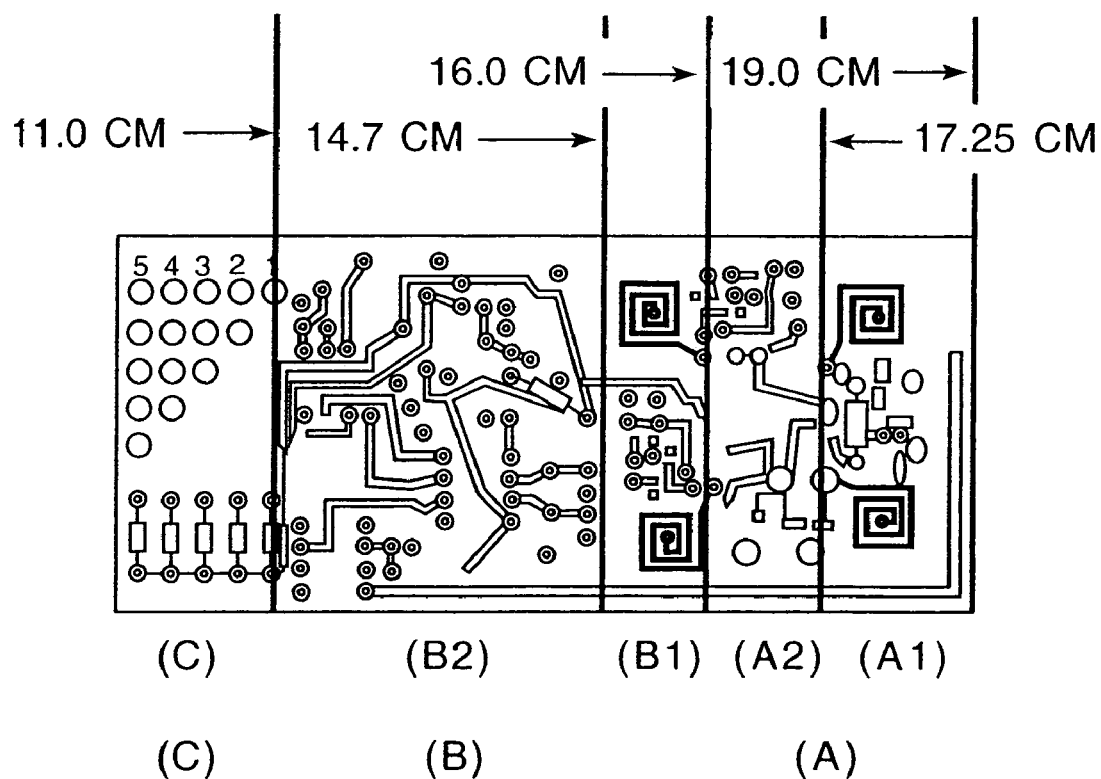
Figure 6A:
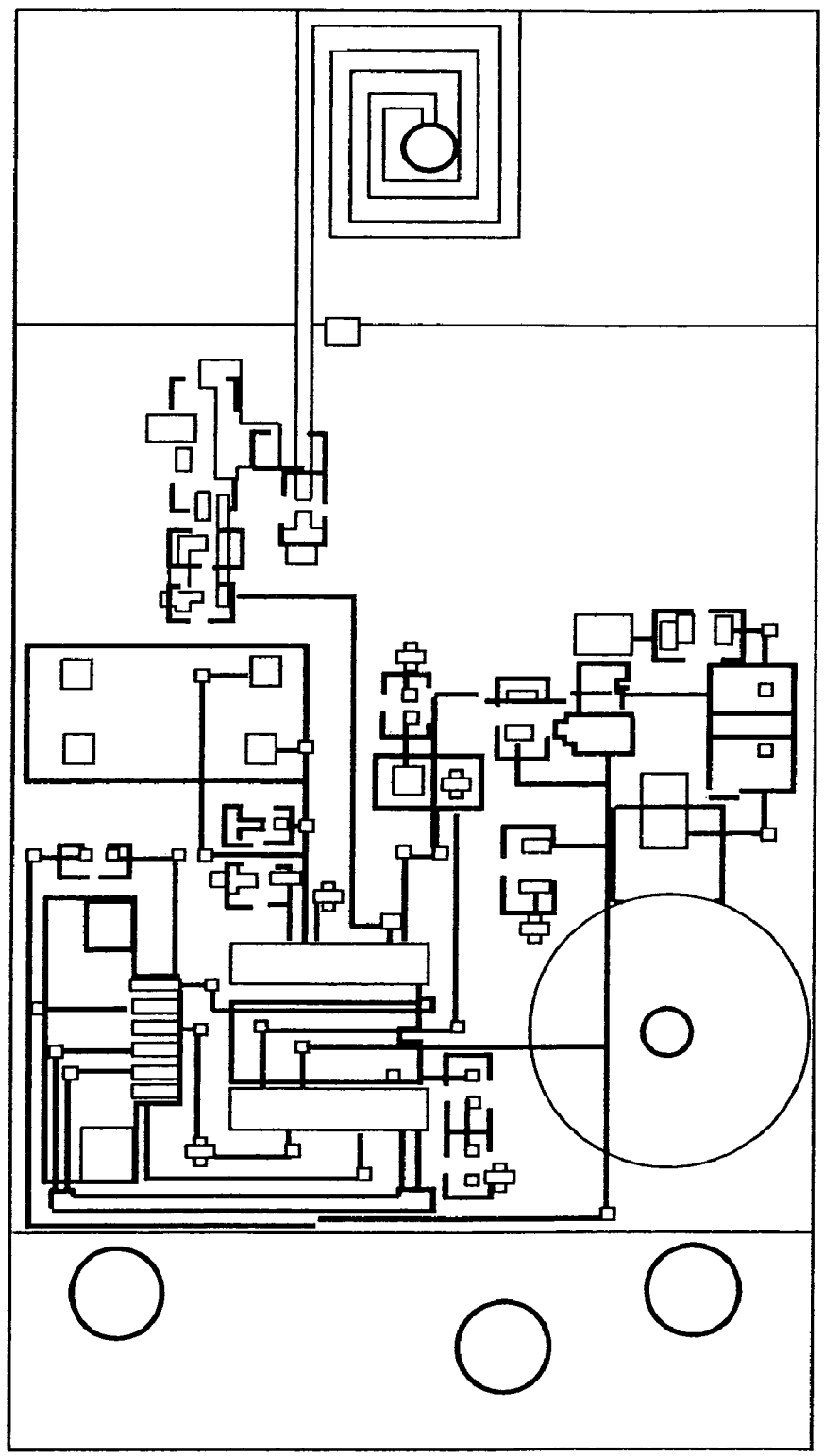
FIGS. 6a–6d show 4 square antenna profiles on a printed circuit board.
Figure 6B:
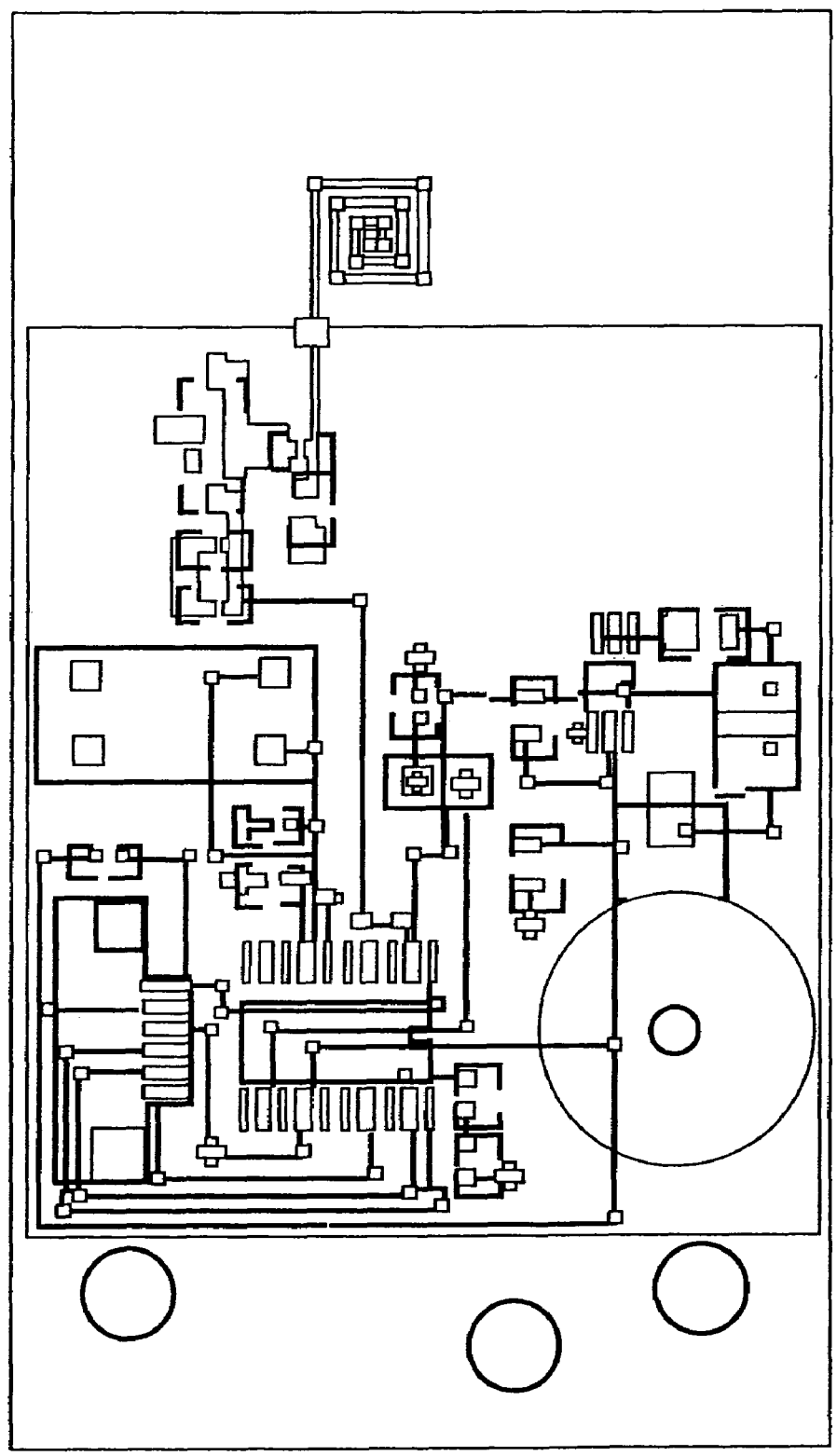
Figure 6C:
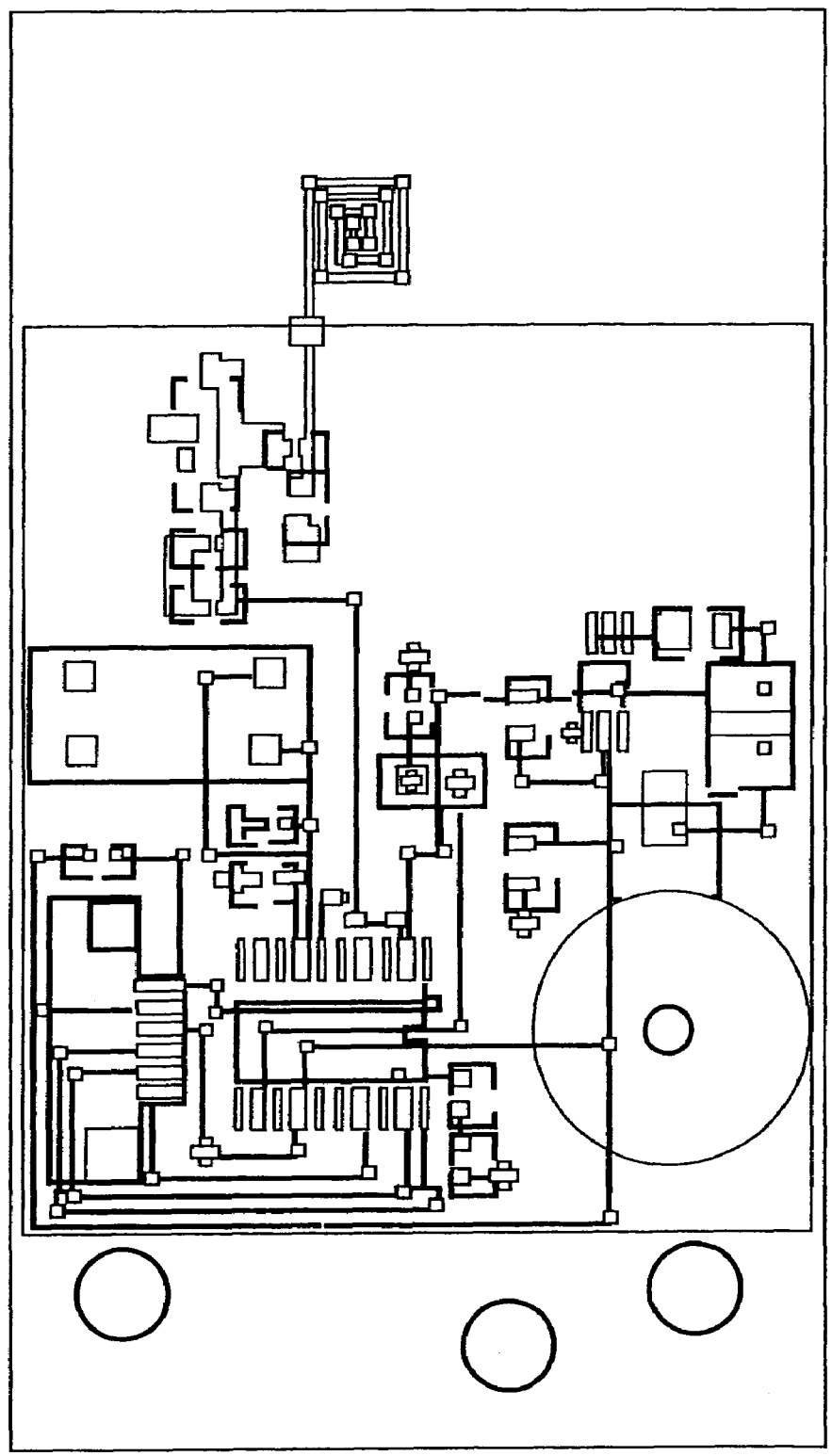
Figure 6D:
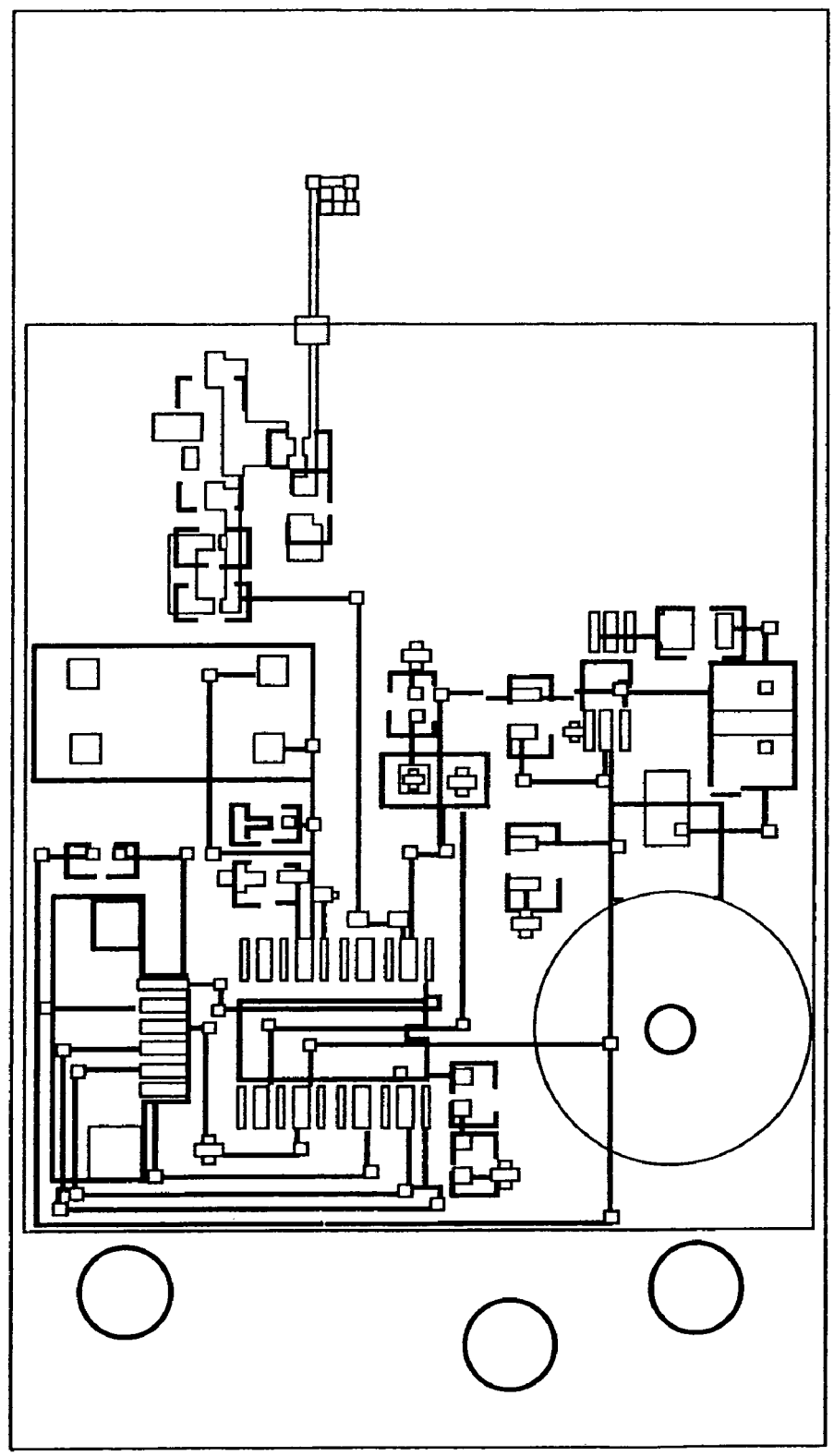

There is an uncertainty in any in situ energy or power measurements due to the measuring circuitry interfering with the device under test. FIGS. 4a–4b include the power measuring device of FIG. 2 along with a graph showing the number of LED's lighted when the space between the energy source and the device is interrupted by a conducting plane inserted perpendicular to a line drawn between the source patch antenna and the device, both of which are parallel. The top of the device was 19.0 cm above the laboratory table top. Conducting planes of 11 cm, 14.7 cm, 16.0 cm, 17.25 cm and 19.0 cm were placed between the antenna and the device. This resulted in lighted LED's numbering 5 (no conducting plane), 4, 4, 3, 2, and 0 respectively for the conducting planes. FIG. 5 is the same set-up as FIG. 4, where the conducting planes were inserted in the order 17.25 to 19.0 cm, 16.0 to 19.0 cm, 14.7 to 10.0 cm, 11.0 to 19.0 cm, and 0.0 to 19 cm. In FIGS. 5a–5b, the LED's that were lighted were 5, 5, 5, 5, 4, and 0.

In the first embodiment of this invention, a device is disclosed comprising an integrated circuit (IC) chip having disposed on it antenna and the circuitry for the IC chip. The antenna or antennas and the circuitry of the IC chip are integrated so as to provide the IC chip with an improved antenna effective area.

In other embodiments, a wireless untethered device such as a printed circuit board may be provided with the desired antenna and circuitry.

"Effective area" of the antenna refers to the functional area of an antenna as compared with the physical area. A tuned antenna may have an effective area that is larger than its geometric area. The phenomenon was disclosed by Reinhold Rudenberg in 1908 [Rudenberg, Reinhold, "Der Empfang Elektrischer Wellen in der Drahtlosen Telegraphie" ("The Receipt of Electric Waves in the Wireless Telegraphy") Annalen der Physik IV, 25, 1908, p. 446–466.] and the description of the phenomena has been expanded upon over the years by many other writers.

U.S. Pat. No. 5,296,866 states that "Rudenberg teaches that the antenna interacts with the incoming field, which may be approximately a plane wave, causing a current to flow in the antenna by induction. The [antenna] current, in turn, produces a field in the vicinity of the antenna, which field, in turn, interacts with the incoming field in such a way that the incoming field lines are bent. The field lines are bent in such a way that the energy is caused to flow from a relatively large portion of the incoming wave front, having the effect of absorbing energy from the wave front into the antenna from a wave front which is much larger than the geometrical area of the antenna."

While the concept of effective area may be known, implementing it in antenna design and construction is not easy or obvious. U.S. Pat. No. 5,296,866 teaches making active antennas that had effective areas greater than the geometric areas through use of special circuitry. The antennas detailed in this disclosure were non-planar coil antennas.

Co-pending U.S. patent application Ser. No. 09/951,031, the disclosure of which is expressly incorporated herein by reference, discloses an antenna on a chip having an effective area 300–400 times greater than its physical area. The effective area is enlarged through the use of an LC tank circuit formed through the distributed inductance and capacitance of a spiral conductor. This is accomplished through the use on the antenna of inter-electrode capacitance and inductance to form the LC tank circuit. This, without requiring the addition of discrete circuitry, provides the antenna with an effective area greater than its physical area. It also eliminates the need to employ magnetic film. As a result, the production of the antenna on an integrated circuit chip is facilitated, as is the design of ultra-small antennas on such chips. See also U.S. Pat. No. 6,289,237, the disclosure of which is expressly incorporated herein by reference.

The invention of this disclosure integrates the antenna and the circuitry of a wireless untethered device such as an integrated circuit (IC) chip or printed circuit board (PCB) to achieve an effective area that is greater than what would be expected from the antenna disposed on the chip alone. By "integrate" or "integration" it is meant that the antenna is disposed on the chip using the circuitry of the IC chip or PCB as part of the antenna function specifically the energy harvesting effective area. Integrating the antenna and proximate circuitry of the IC chip or PCB simplifies the design of the chip because placing the discrete antenna and proximate IC chip or PCB circuit components in discrete areas of the chip is no longer necessary.

In general, a preferred approach is to have the antenna designed as an integral element which is connected to the circuitry with proper impedance matching. If desired, the circuitry can be designed and then the antenna can be designed for maximum performance efficiency in the presence of the circuitry with particular emphasis of use in small, wireless untethered devices.

One advantage of integrating the antenna and the proximate circuitry of the IC chip or PCB is that the physical size of the antenna component is no longer the sole driving force in obtaining greater effective area. Using the embodiment of this invention, the effective area of the antenna is a combination of the physical size of the antenna and proximate IC circuitry on the IC chip or PCB. In essence, the antenna on the IC chip or PCB for all practical purposes is the whole IC chip or PCB and not a specific portion of IC chip or PCB that has the physical antenna disposed on it. It will be appreciated that in the IC chip, PCB or other embodiments the effective area of an antenna may be greater than the physical area of the IC chip, the PCB or other substrate. In fact, isolating the physical antenna into separate portions of the IC chip or PCB (i.e., peripheral or a distinct area of the central portion) can be detrimental to making IC chips or PCBs with effective areas greater than the effective area from the isolated physical antenna.

The design of an antenna on chip or PCB involves a number of sets of information; (1) frequency of operation (center frequency), (2) bandwidth at the half power points, (3) Q—ratio of peak performance to that of the half power points, (4) the electrical and magnetic properties along with thickness of each process layer—typically termed the technology files.

Given the appropriate design information, an architecture, e.g., whip, dipole, square spiral, round spiral, etc. is selected. Next, a range of parameters such as conductor length equal to wavelength (center frequency) divided by 4, resonance of the antenna at the center frequency, etc.

Using the resonance strategy, the antenna parameters and configuration are then adjusted to achieve resonance using the parasitic and inter-electrode inductance and capacitance including the electronic and magnetic properties as given in the technology files.

The resonance is normally checked through computer aided design software including simulation.

FIGS. 4a and 4b illustrate the test apparatus including; (A) two spiral energy harvesting antennas with circuitry for rectification and voltage "doubling" (charge pumps), (B) interconnection circuitry, and (C) the power, voltage measurement circuitry (power meter).

The measurement of power and/or voltage on a remote autonomous device is complicated by the inability to connect non-interfering wires to the device, and the fact that as the size of the device decreases, there is an inherent uncertainty concerning the effect/contribution of the measurement circuitry itself on the measurement. The effective area measurements in the Co-pending U.S. patent application Ser. No. 09/951,031, involved connecting wires in order to effect the power measurements.

A series of experiments were run with the device of FIG. 4b in the field of an RF source antenna at 915 MHz. In these experiments, a flat conducting surface (plane) was placed between the source antenna providing the RF energy and the device under test at an approximate distance of 0.25 inches from the device. Five conducting planes were used where the planes shielded areas of the device at the 5 heights shown in FIGS. 4a and 4b.

The height of 19.0 cm represents the height of the top of the device above the laboratory bench. The 5 heights of the conducting plane in the 5 experimental positions were 19.0 cm, 17.25 cm, 16.0 cm, 14.7 cm and 11.0 cm respectively. The points on the graph above the device in FIG. 4a, represents the number of LEDs lighted on the power meter section (C) of the device. The number of LEDs lighted is proportional to the voltage across the LEDs and represents a lower bound on the voltage dropped across the 1 K ohm resistor that can be seen in area (B2) of FIG. 4b.

As can be noted from the FIG. 4a graph, while exposing the strict antenna area (A1) to the RF field does in fact harvest sufficient energy to light 2 LEDs, exposing additional device area facilitates additional energy harvesting, including the power meter area (C).

It is noted that for the proximate electronics in (B2) and (C), the function of the circuitry is strictly DC including the DC bus noted in area (B1).

A functioning power meter (C) when totally removed from the device parts identified as (A) and (B) shows no lighted LEDs. Thus, as an energy harvesting device, the power meter by itself will not harvest sufficient energy to light a single LED. However, when connected to the device, the area and circuitry contribute to the energy harvesting by an amount of 74.9 milliwatts in terms of measured power and sufficient voltage to light an LED.

In FIGS. 4a and 4b, the conducting planes were introduced in the sequence 19.0 cm, 17.25 cm, 16.0 cm 14.7 cm and 11.0 cm. The results of a similar experiment with the sequence of conducting planes were introduced in the sequence 17.25 to 19.0 cm, 16.0 to 19.0 cm, 14.7 to 19.0 cm 11.0 to 19.0 cm and 0 to 19.0 cm, respectively.

While no mathematical model is proposed for the results of FIGS. 4 and 5, it is obvious that the proximate interconnections (B) and circuitry (A2) contribute to the total amount of energy harvested by increasing the effective area of the harvesting antennas.

It is clear that more than one factor contributes to the effectiveness of the antenna/device combination in harvesting energy. We have chosen to note the effective area do to the results of Rudenberg as Rudenberg effective area, and the remainder of the effective area due to components and interconnections as proximate effective area.

The present invention is concerned with the design and analysis of small antennas for the purpose of harvesting energy on a printed circuit board (PCB) or a complementary metal oxide semiconductor (CMOS) die in order to provide power to on board circuitry without the need for batteries or external connections as a source of power.

Earlier design of such devices has led to the desire to use a square spiral coil as the profile for the antenna. Thus, this disclosure will be mostly concerned with the square spiral antenna although a patch design will be included from time to time.

Given the square spiral profile, there are still many parameters of the design that must be considered and chosen. This disclosure is concerned with a series of experiments that were run in an effort to evaluate these alternatives using PCB implementations. However, the ultimate goal is to implement the square spiral on a CMOS die thus opening up the question of what differences in performance can be expected with the CMOS implementation.

The approach to the analysis is strictly empirical although a few references may be made to classical approaches either to antennas or electronic circuits. The sole purpose is given a square spiral implementation, what are the parameters values that provide the greatest amount of power or energy at the payload circuitry in this case a 10 K ohm resistor.

Printed circuit test boards each containing a target antenna have been constructed where the voltage across the target load is measured by an analog to digital converter, frames and transmitted by an infra red transmitter to a receiver connected to a data gathering personal computer. The test/ measurement circuitry is powered by a small battery. All test/measurement circuitry and the battery are located behind a ground plane for the circuitry so as to shield the circuitry from an energizing radio frequency (RF) source whereby a contribution to the power/energy can be attributed to this circuitry.

Other research has demonstrated that the proximate circuitry can be used to advantage in harvesting energy.

Previous attempts to measure the energy harvested by small antennas have been complicated due to the measurement equipment that is connected to the device under test (DUT). Thus, the attempt here is to include the test circuitry directly on the DUT. As indicated previously, the circuitry included with the DUT can have an effect on the results thus leading to the shielding of the test circuitry behind a conducting plane as shown in FIGS. 6a–6d.

Over many decades it has been difficult if not impossible to prove that the test circuitry does not have an effect on the results of the experiment, the results reported in this paper suggest that the effect is minimal through some of the profiles of the DUT, e.g., antenna area as shown in FIGS. 6a–6d for antennas A through D.

The design of antennas in a limited space such as on a printed circuit board or a Complementary Metal Oxide Semiconductor (CMOS) chip or die requires the consideration of a number of physical factors of the antenna to obtain an optimum performance. These factors include:

(1) The area allocated to the antenna including the actual metallic conductor forming the antenna and any space required to form or shape the metallic conductor. The metallic conductor has certain characteristics, e.g., shape (profile), conductor width, conductor thickness, and conductor length.

(2) One of the profiles considered in this research is a square spiral. The topological nature of the square spiral is that connection can be made in the plane of the antenna from the last outside trace of the spiral. Such a connection will be noted as a micro-strip line feed. The inner end of the spiral must be connect through a via to another layer of the PCB or CMOS die. Such a connection will be noted as a probe feed. Two general profiles are considered in the research reported herein, a square spiral and a square patch.

(3) The antenna environment includes any form of conductor, insulator, etc., that exist between the source of the radio frequency (RF) energy and the antenna or behind the antenna. One form of element can be a ground plane formed as a part of the PCB or CMOS die.

(4) The antenna is connected to a circuit (energy harvesting in this case) where both the antenna and the circuit (load) have an impedance. For optimum performance, it has long been held that the two impedances should be matched as complex conjugates, i.e., impedance matching, with equal real (resistance) components.

(5) There are two areas involved in the antenna design. The first is the physical area required to implement the antenna. The second is the effective area resulting from dividing the power received at the load by the power density in the field in which the antenna is place, i.e., Power Harvested=Power density*Effective Area.

Figure 7:
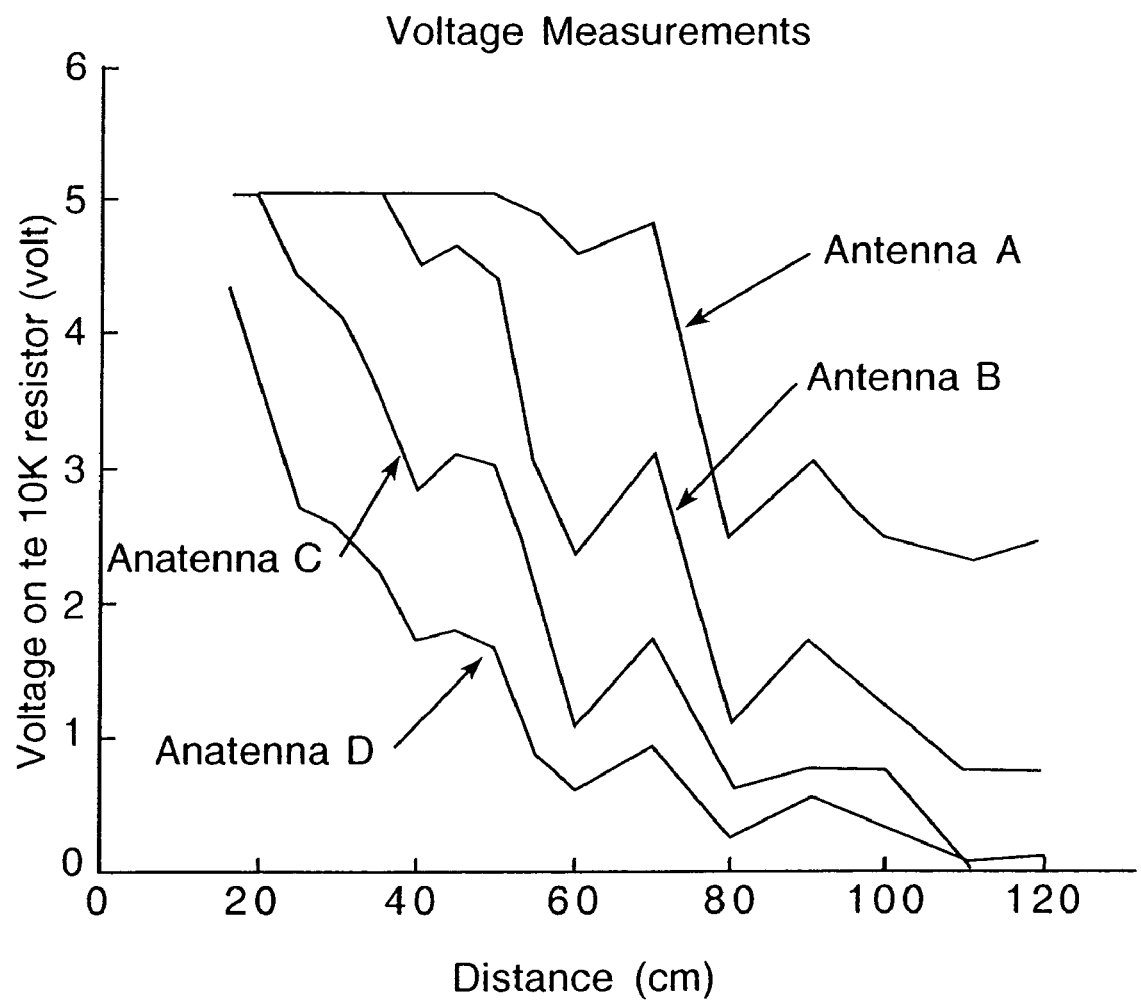
FIG. 7 is a plot of distance versus voltage for the four antennas shown in FIG. 6.

In summary, the factors involved in the design of an antenna in a limited space, e.g., a PCB or a CMOS die are:

(A) Physical Area
(B) Profile
(C) Antenna Conductor Width
(D) Antenna Conductor Thickness
(E) Antenna Conductor Length
(F) Feed Type
(G) Ground Plane Existence
(H) Impedance Matching (A) Physical Area Four antennas of a square profile with four different areas as illustrated in FIGS. 6a–6d, have been constructed. The voltage response measured at the load of the four antennas in shown in FIG. 2. The antennas are compared at a harvesting distance of 50 centimeters by plotting the voltage harvested at the load as shown in FIG. 7. Based on the results of FIG. 8, it is clear, as expected, that the amount of energy harvested increases with increased area. This area is termed the physical area.

(B) Profile

Two profiles are considered in this study, a square spiral and a square patch. FIGS. 9a–9e illustrate five antennas, four of which are square spirals and one is a square patch (Antenna D, Board H1).

Figure 10:
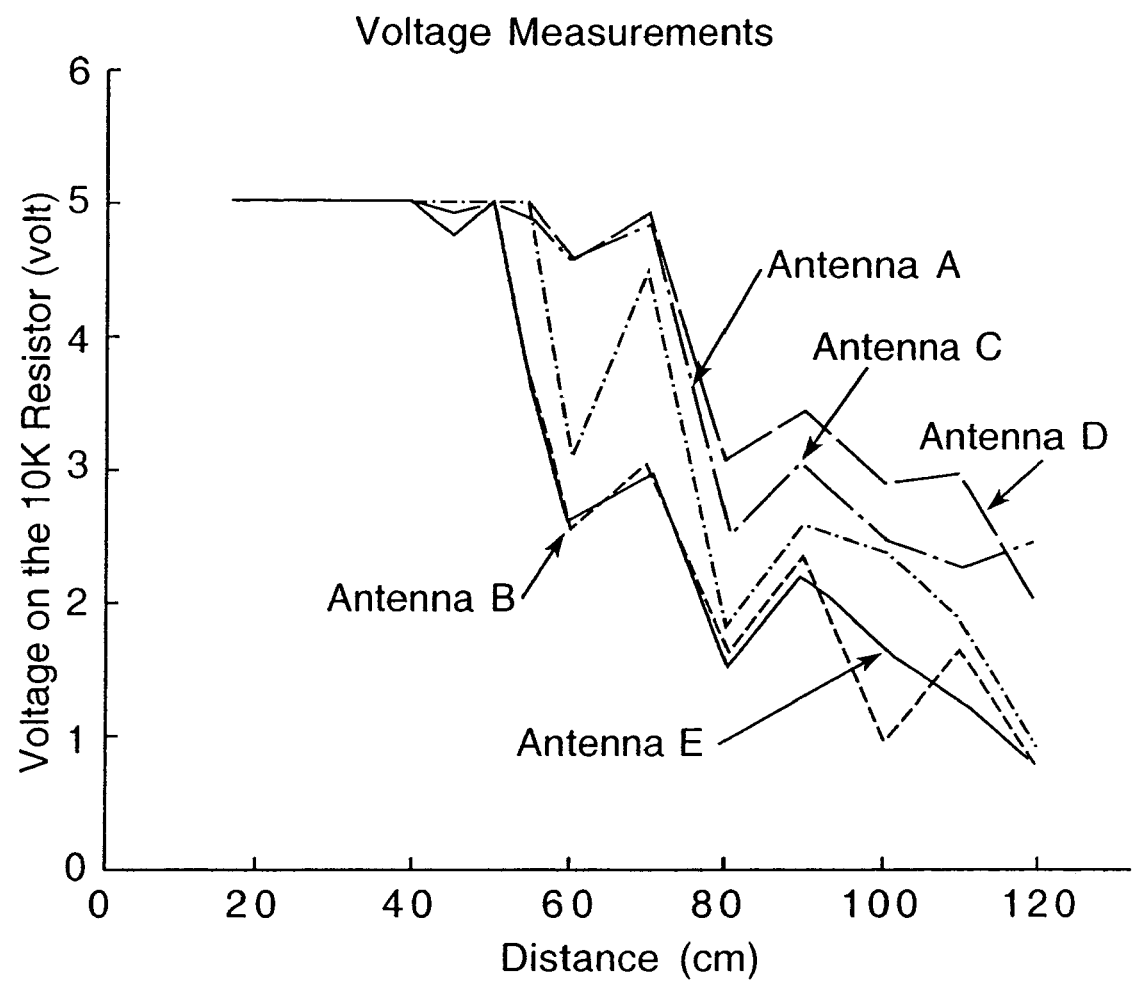
FIG. 10 is a plot of voltage versus distance for the antennae of FIGS. 9a–9e.

The voltage results for the profile test cases are illustrated in FIG. 10. It can be argued from FIG. 10 that the best results are obtained with the square patch. The differences are not great, but there are differences. However, the square patch has a disadvantage in that the impedance for impedance matching requires an inductor as the patch has a capacitive impedance. In addition, the impedance of the antenna is fixed by the physical area. In the case of the square spiral antennas, the impedance of the antenna may be varied while maintaining a fixed physical area. In the case of the square patch, the matching requires an inductor that is difficult to fabricate on a CMOS die and not easy to precisely match with an on die inductor or a discrete inductor for the PCB implementation. The inductor is required to form the complex conjugate as the square patch is capacitive.

Figure 11:
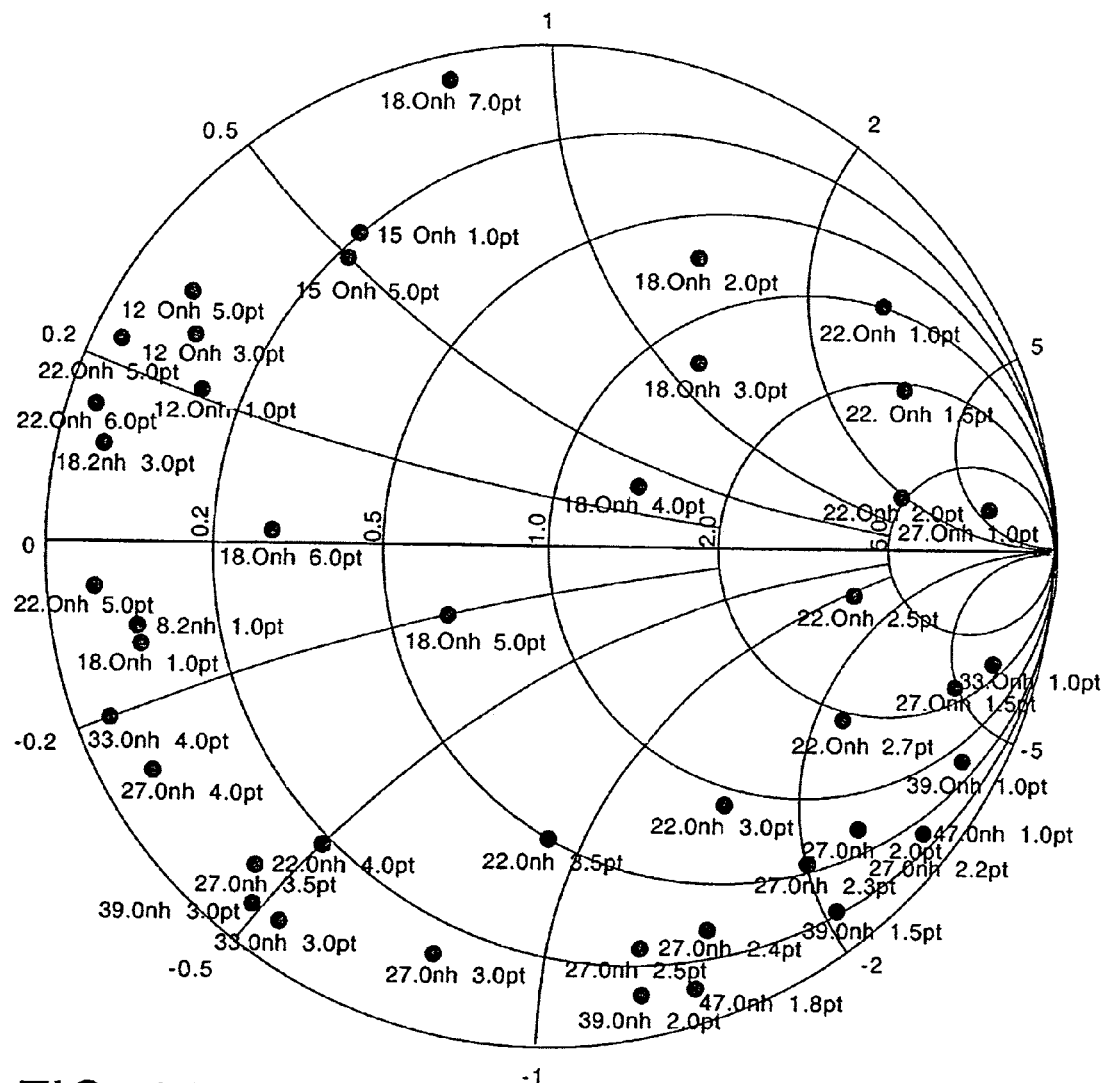
FIG. 11 is a representation of impedances for various parameters.

The square spiral can be modified by trace width, thickness and relative spacing to have essentially a continuum of impedances many of which are illustrated in FIG. 11. This variation is particularly useful in coordinating the matching impedance between the load and the antenna. Thus, from a design standpoint, the square spiral is the profile of choice.

Figure 9A:
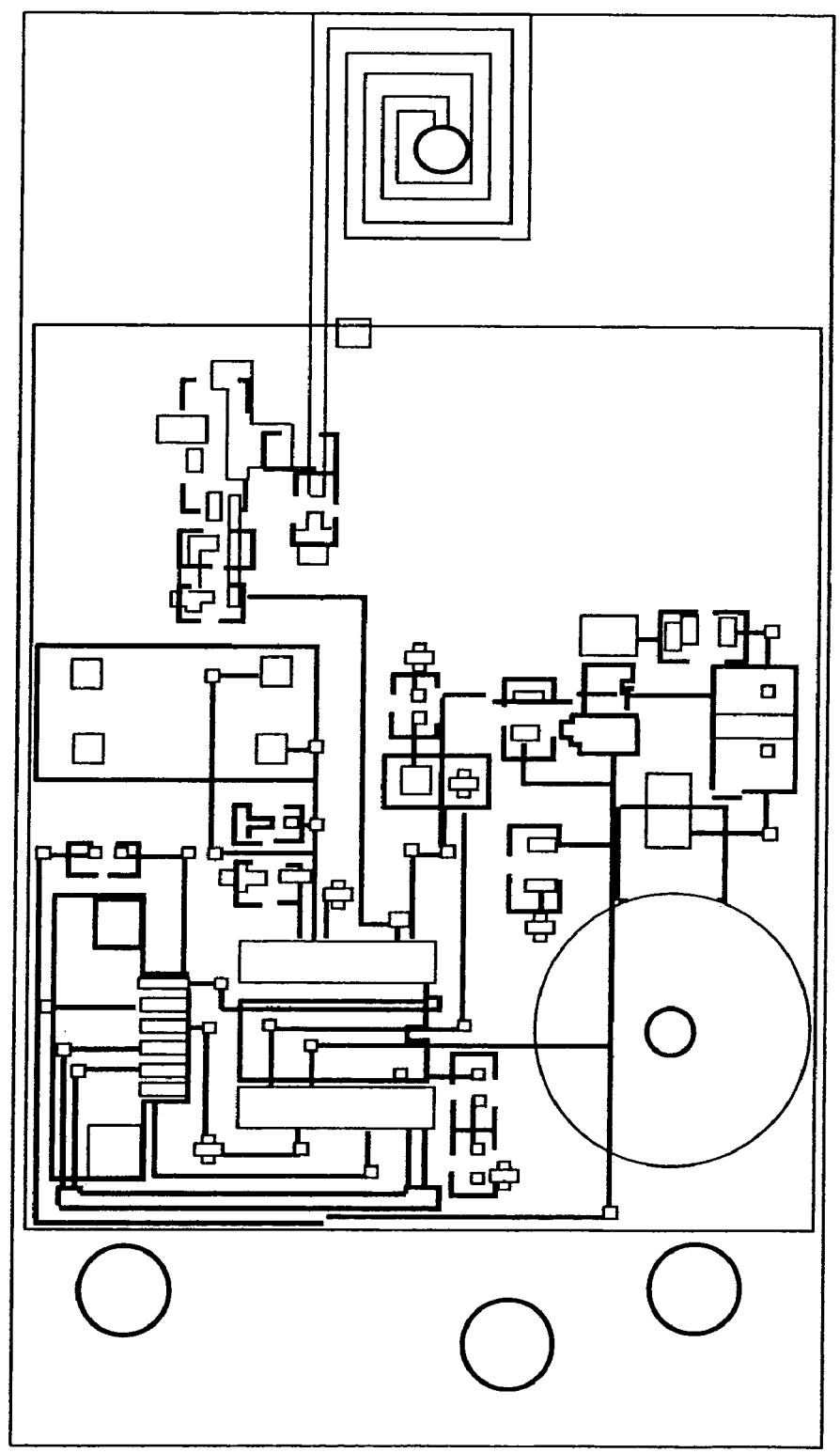
FIGS. 9a–9e show five antennas with four being spiral and one being a square patch.
Figure 9B:
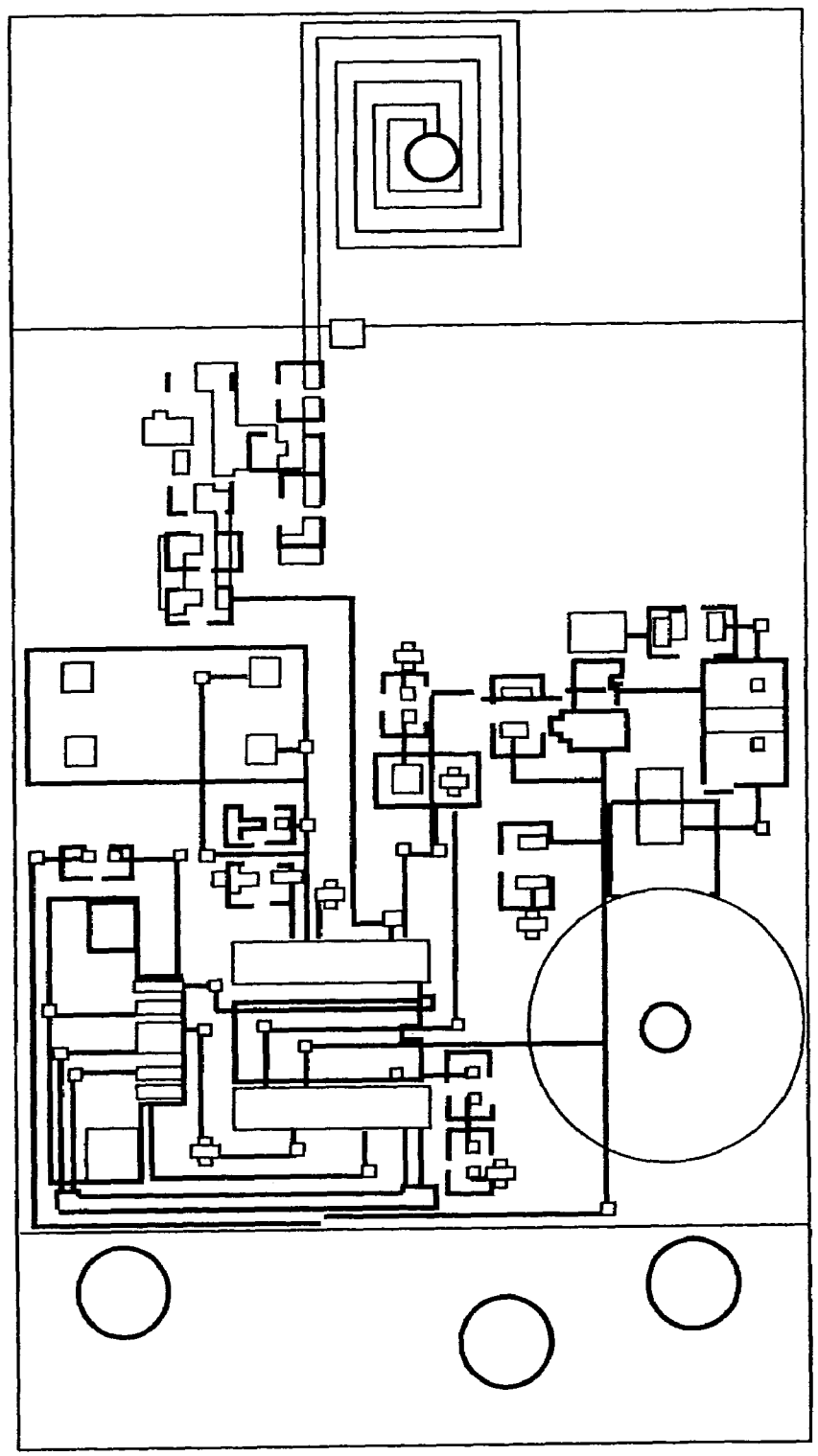
Figure 9C:
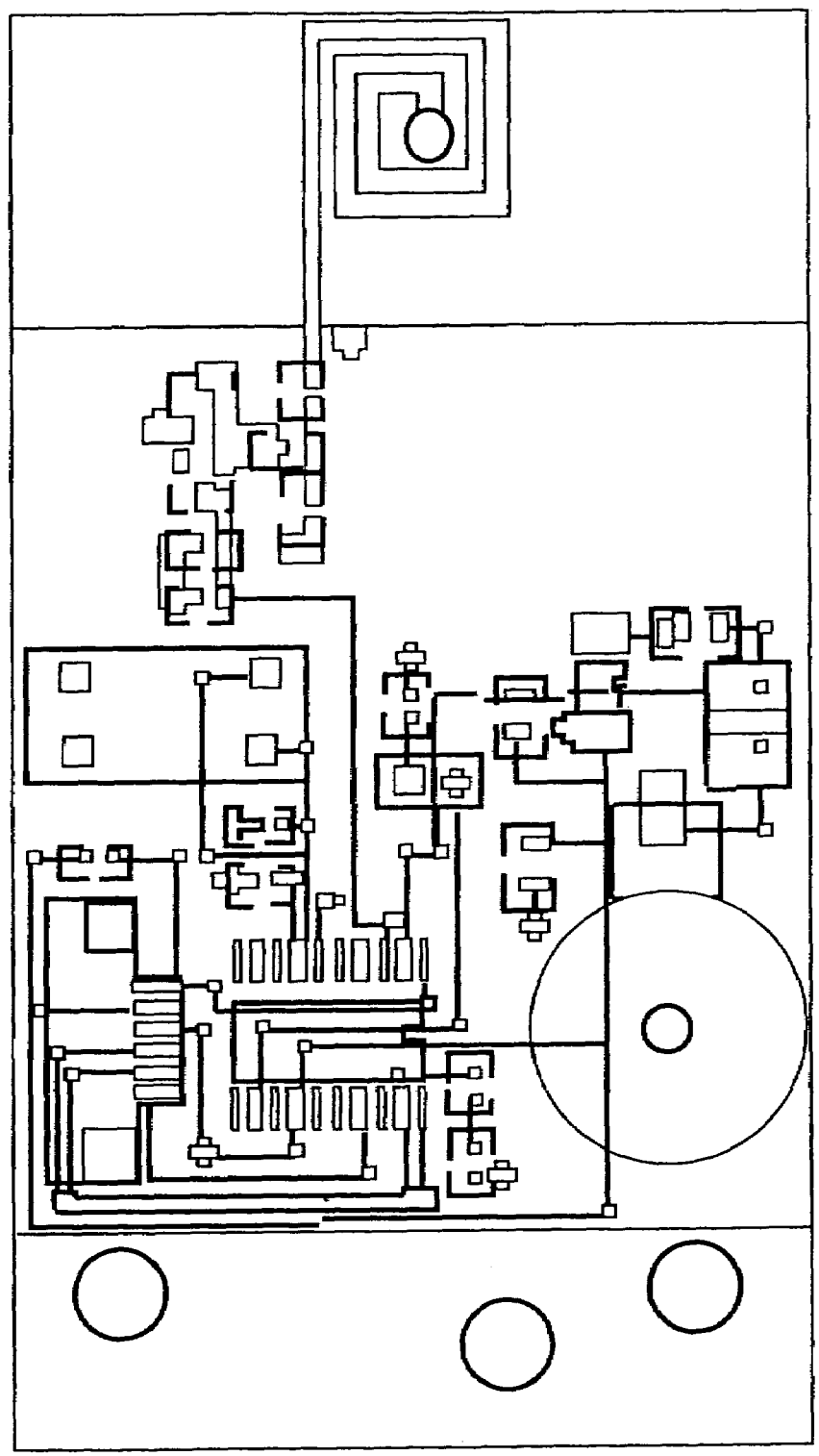
Figure 9D:
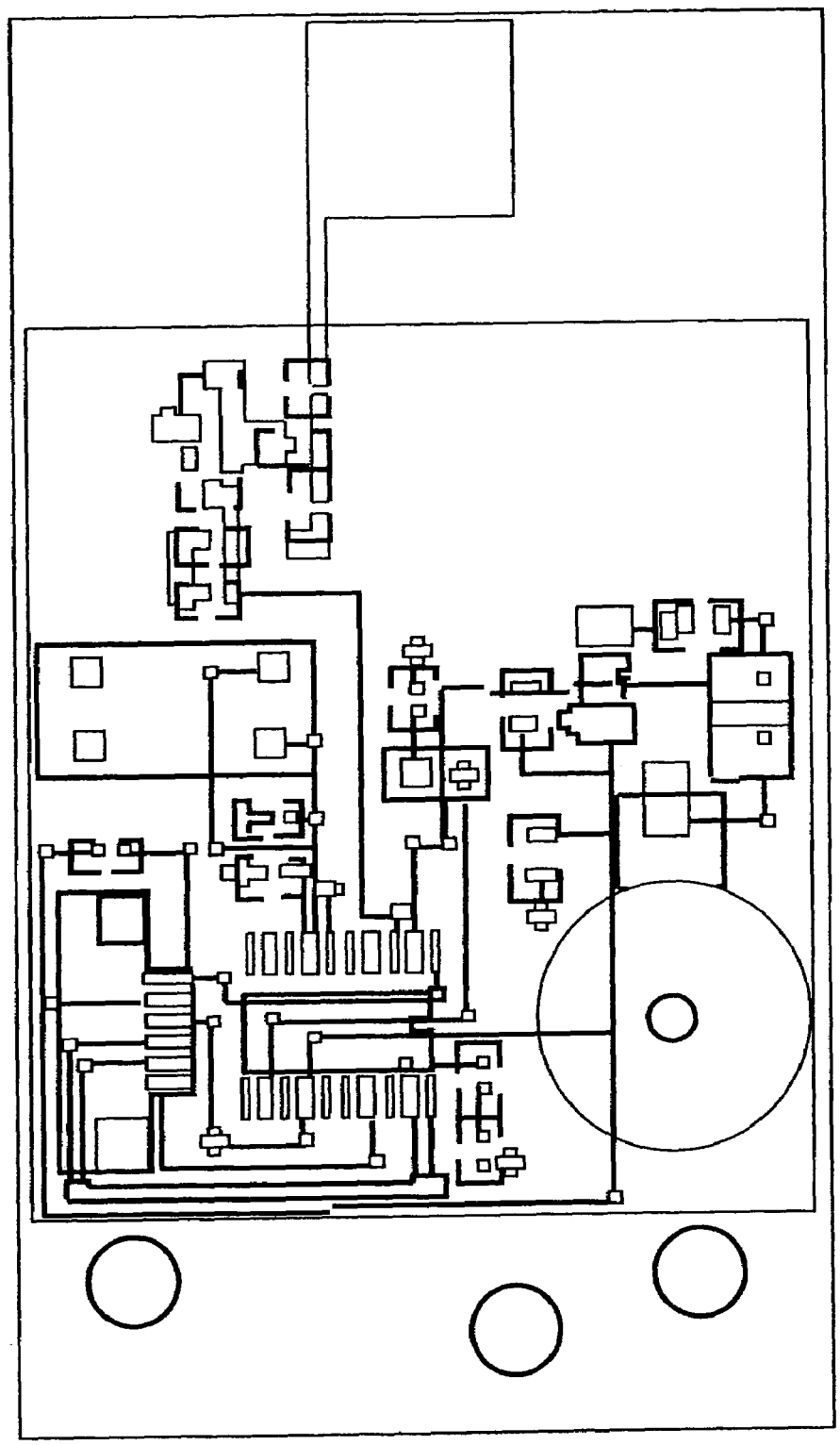
Figure 9E:
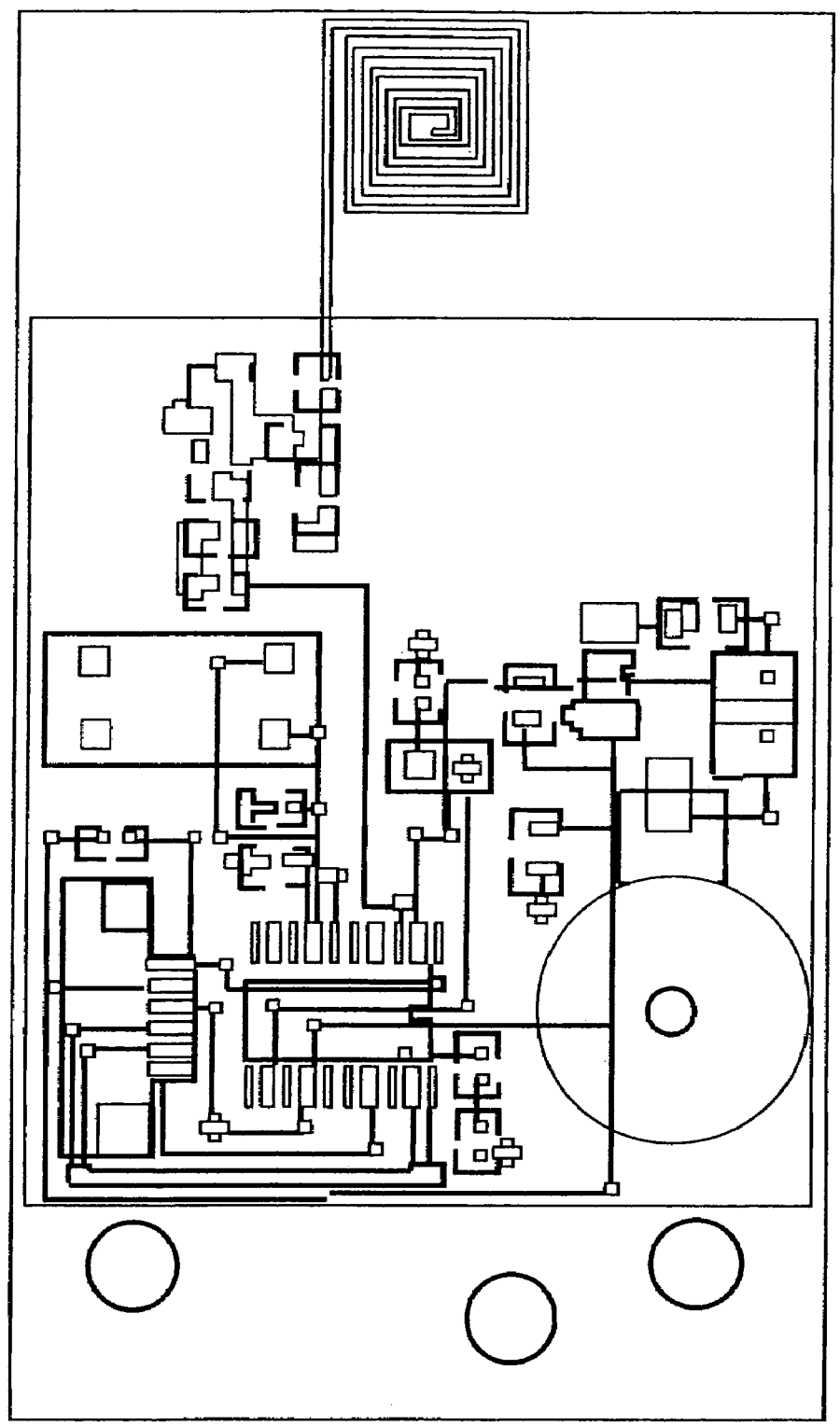

Antenna E in FIG. 9e, while a square spiral, has length greater that the ¼× length of Antennas A, B, and C. The length of antenna E is greater than ¾×. Thus, the length of the antenna conductor is a factor in designing the most efficient PCB or die (chip) antenna. While the ¼× length is better for design purposes as the added length does not gain any appreciable advantage, this does not constitute a proof for the optimum length. The major contribution here is that the antenna conductor length is a factor that must be considered in the antenna design.

(C) Antenna Conductor Width

The antennas A, B and C of FIGS. 9a–9c vary in trace width. Based on the results of FIG. 10, the trend lines are shown in FIG. 12.

Figure 12A:
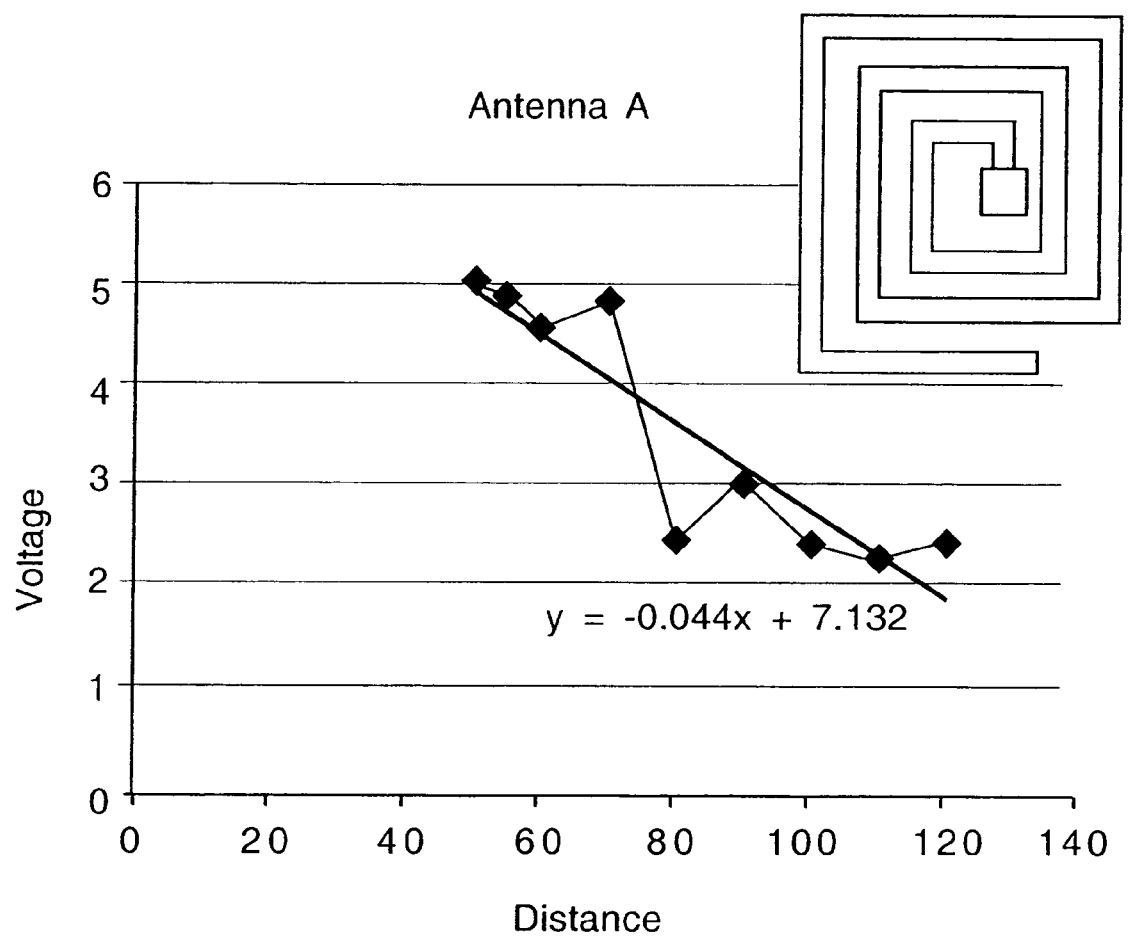
FIGS. 12a–12c illustrate three variations in trace width for an antenna with plots of voltage versus distance.
Figure 12B:
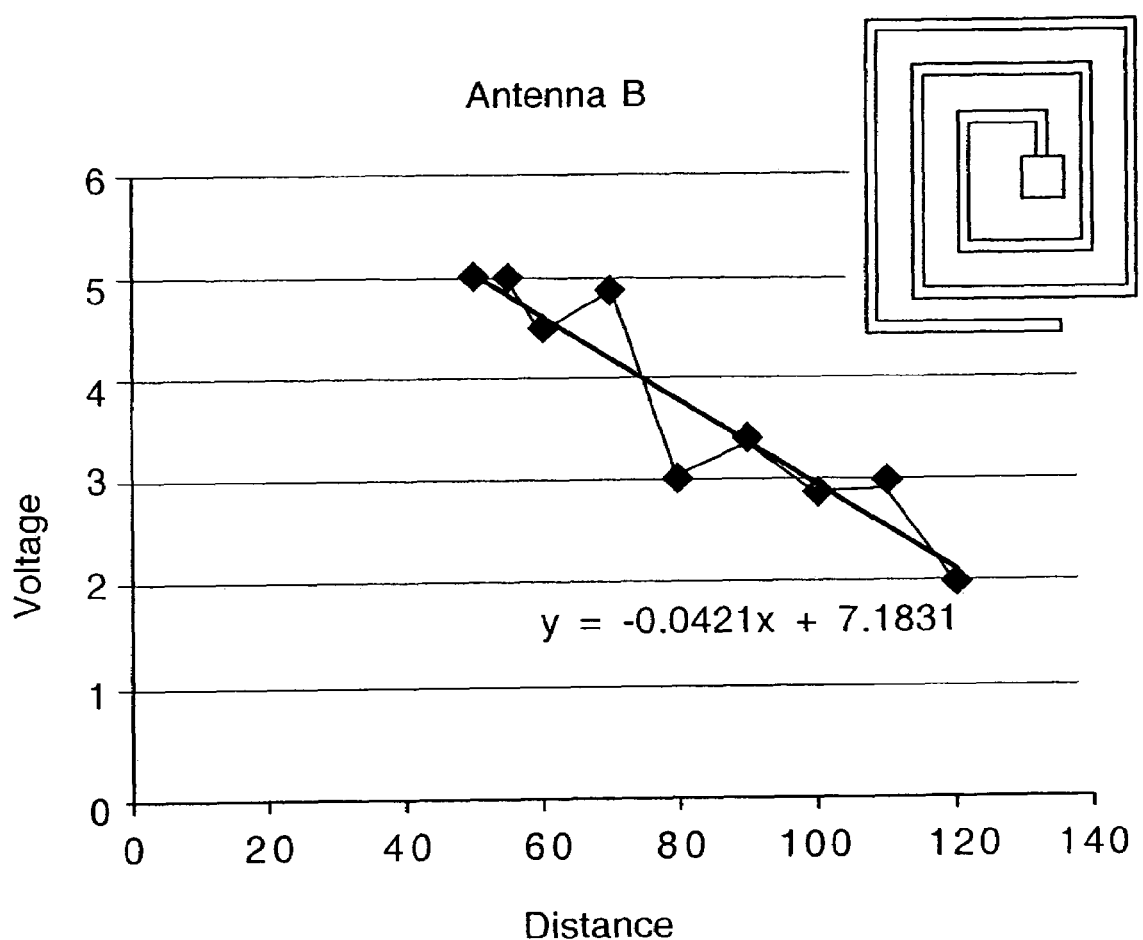
Figure 12C:
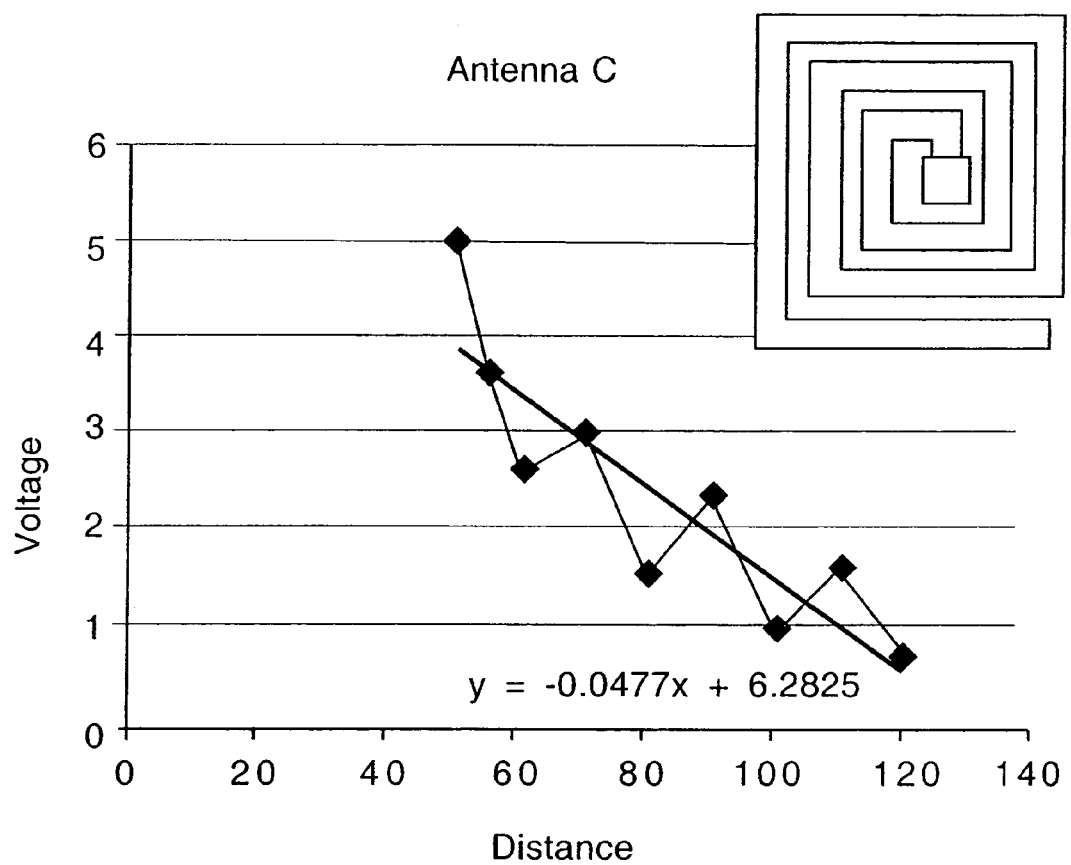

From FIG. 12, the slope, i.e., rate of voltage decrease is the least for antenna B. In addition, the trend line for antenna B has the largest y intercept. Both of these results support antenna B with the narrowest trace width as being the optimum for this set of experiments.

(D) Antenna Conductor Thickness

Two independent experiments were run for antenna thickness. The first began with one of the type A antennas to which additional conducting solder was first added and then some of the added solder was removed. This gave an original thickness, a much thicker trace and thirdly a trace of intermediate thickness. These steps produced three different thicknesses of the antenna conductor thicknesses indicated in FIG. 13a.

Figure 13A:
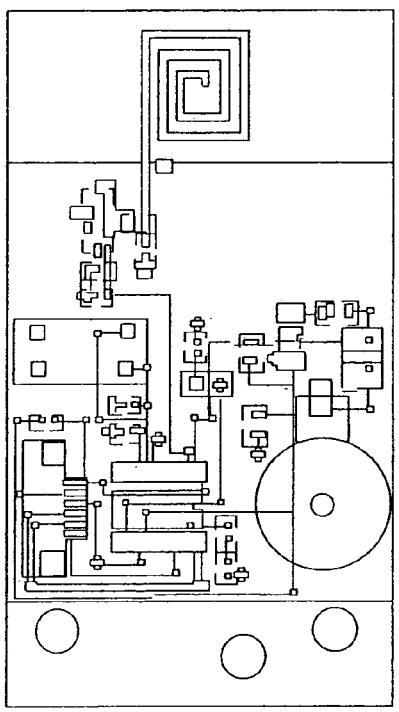
FIGS. 13a–13b illustrate data for antennas of two different materials and three different thicknesses.
Figure 13B:
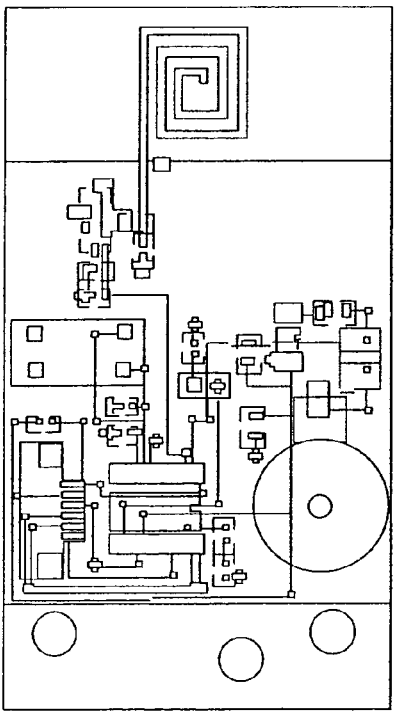

Using another set of independent boards and steps, all solder was removed from the antenna exposing the bare copper giving the thinnest trace thickness. The copper was then electroplated onto the antenna to give different thicknesses of copper and thus three different values of antenna conductor thicknesses as indicated in FIG. 13b. The measured results for both lead and copper additions are illustrated in FIGS. 13a–13b.

Figure 14A:
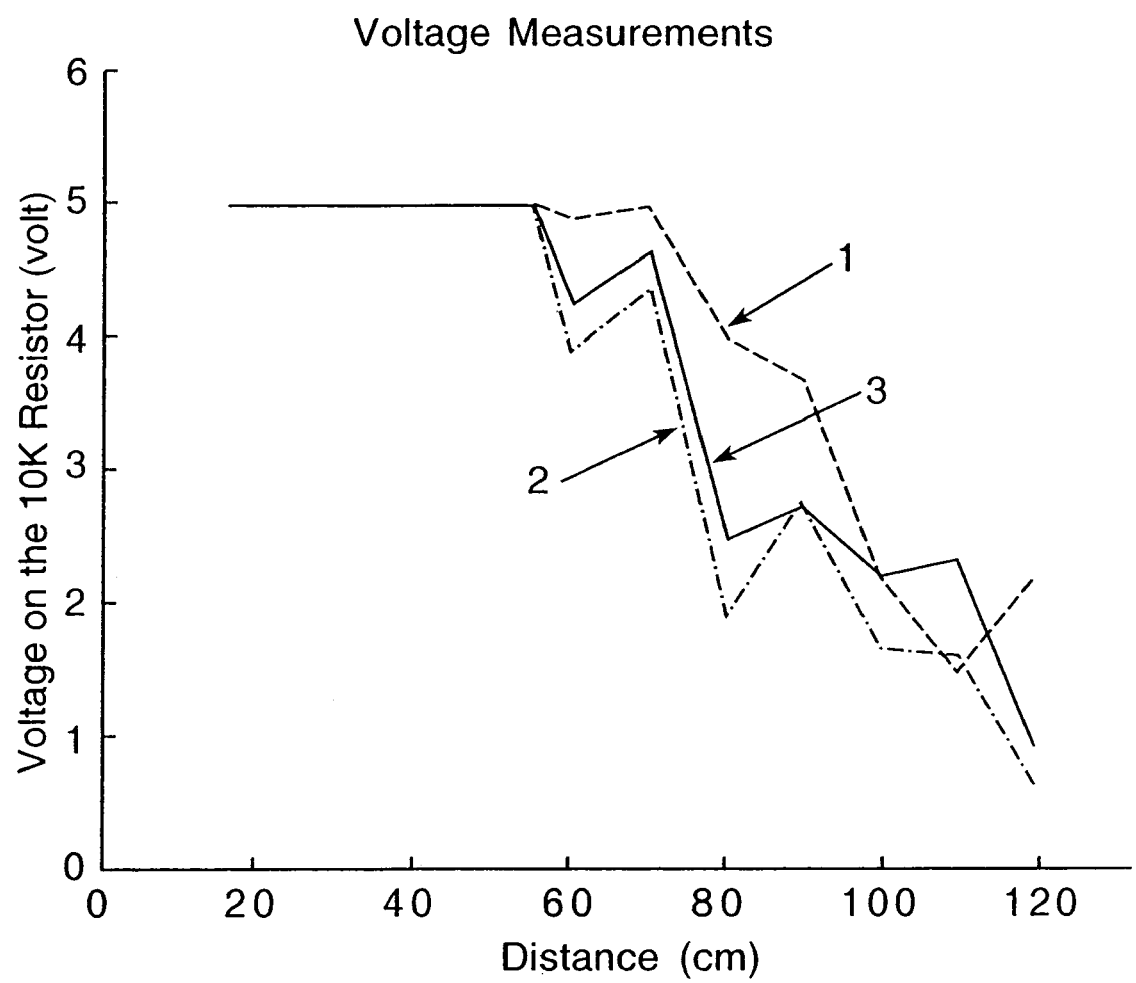
FIGS. 14a–14b show plots of voltage versus distance for the antennas of FIGS. 13a–13b.
Figure 14B:
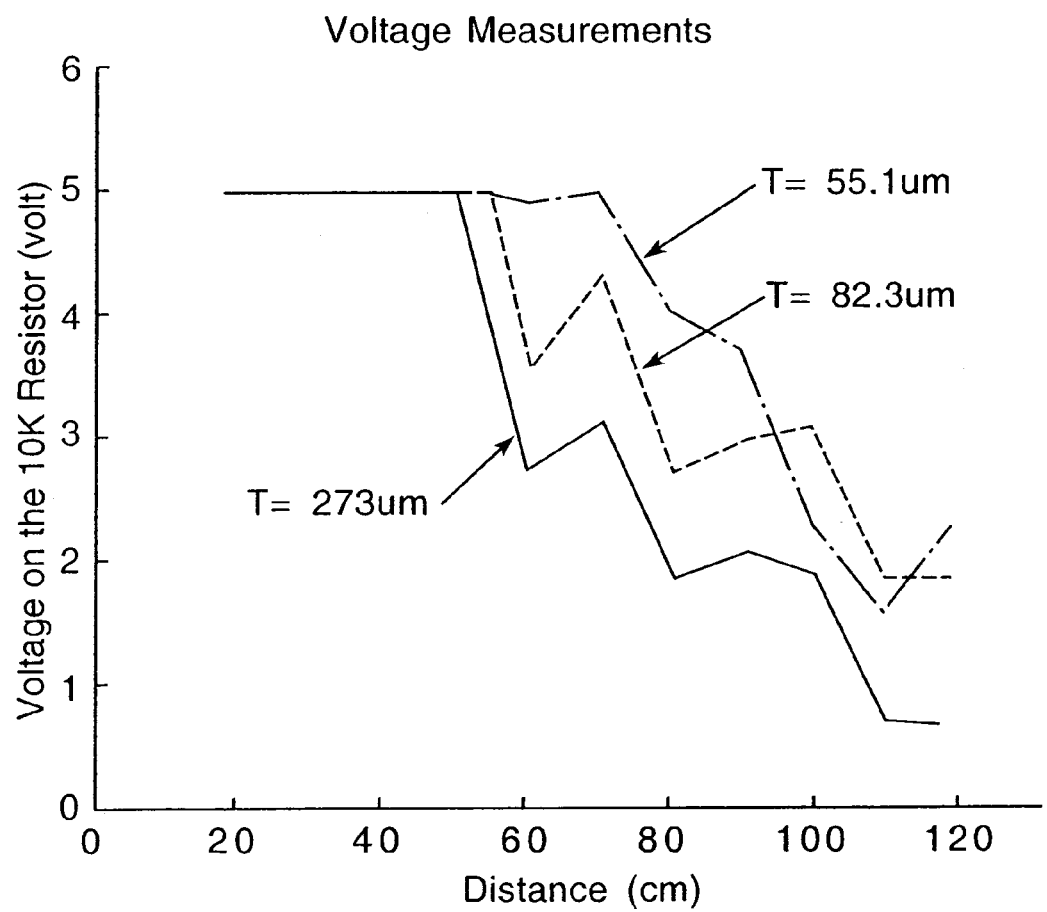

Based on the results shown in FIGS. 14a–14b, it is quite clear that the best energy harvesting, highest voltage levels, is accomplished antenna conductor thickness is the thinnest. The results of the two thicker traces in FIG. 14a are very close and no conclusion should be drawn solely with respect to these two antennas. The removal of the solder from the thickest trace caused a minor amount of melting of the solder having a minimal effect on the antenna profile. However, these two thicknesses relative to the thinnest trace thickness can be considered significant.

(E) Antenna Conductor Length

The antenna conductor length results can be observed considering FIGS. 9a–9e and 10. While there does appear to be some equivalence in the results of antenna B and antenna E in FIG. 19, the results at the 50 centimeter distance was chosen as the point of comparison show that nothing significant is gained by the additional length. In fact, the length is definitely less useful when compared to antennas A and C. Thus it is an initial conclusion that the primary criterion for the antenna to minimize area and maximize the amount of energy harvested that the length by held at or near ¼ wavelength.

Figure 15A:
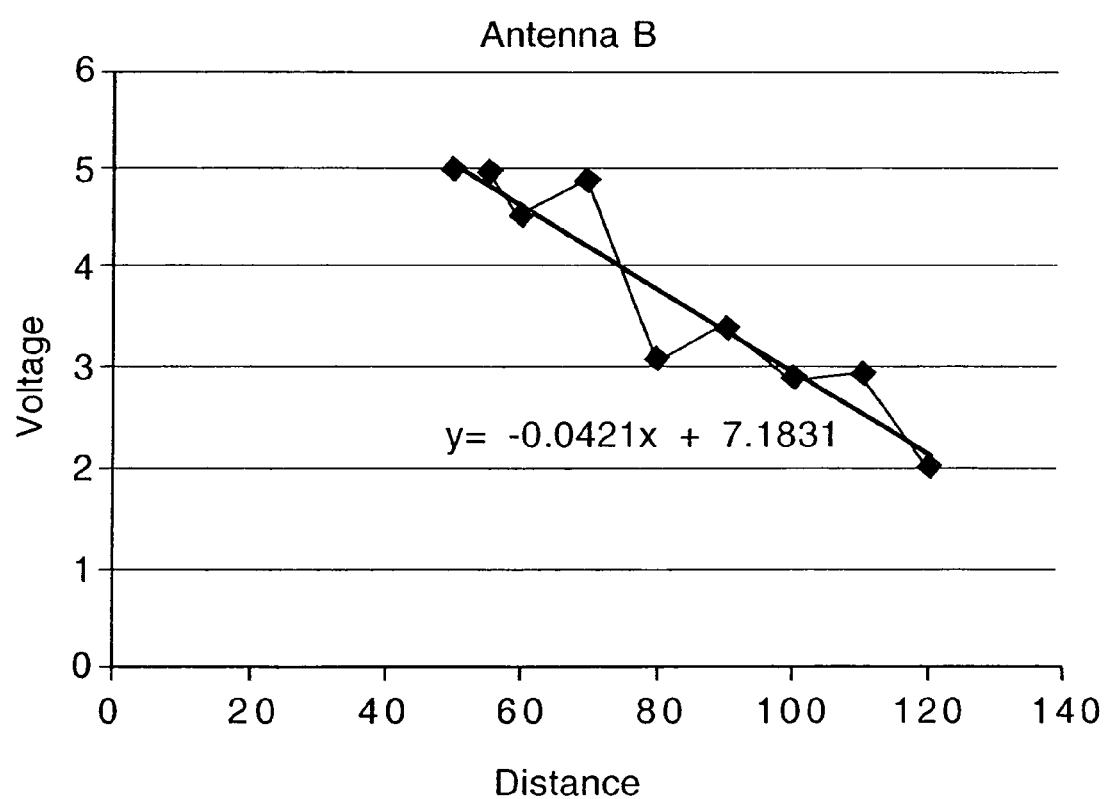
FIGS. 15a–15b show plots of voltage versus distance for different lengths.
Figure 15B:
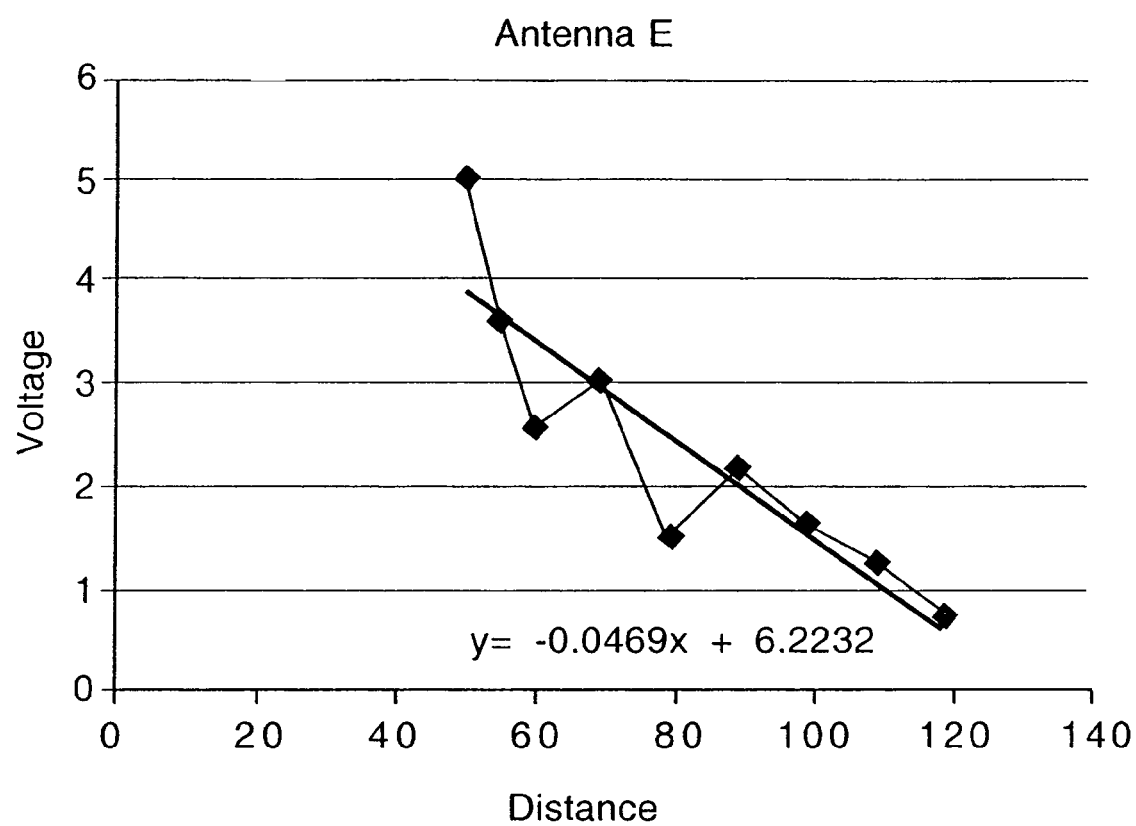

FIG. 15a. is the trend line for Antenna B, and FIG. 15b is the trend line for Antenna E. In comparing B and E, the rate of drop off for E is greater and E also has a lower y intercept There is perhaps another significant point in comparing the two antennas B and E. From a -traditional antenna design standpoint, it could be argued that the two antennas should have performances with more significant differences than are shown in these results.

The explanation offered here is that the most significant feature of the small antennas is the fact that there exists a resonant tank disturbing the field which modified the effective area of the antenna. Thus, these two antennas of significantly different lengths produce similar results supporting the notion that the resonant tank circuit is the most significant aspect of the small antenna.

(F) Feed Type

Figure 16A:
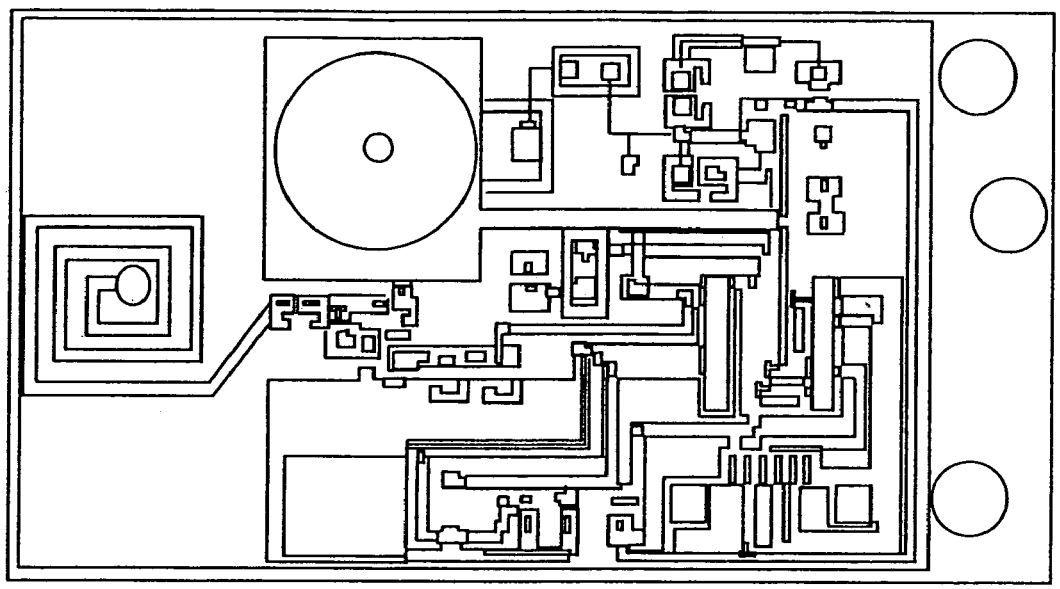
FIGS. 16a–16b illustrate two different feed arrangements for antennas.
Figure 16B:
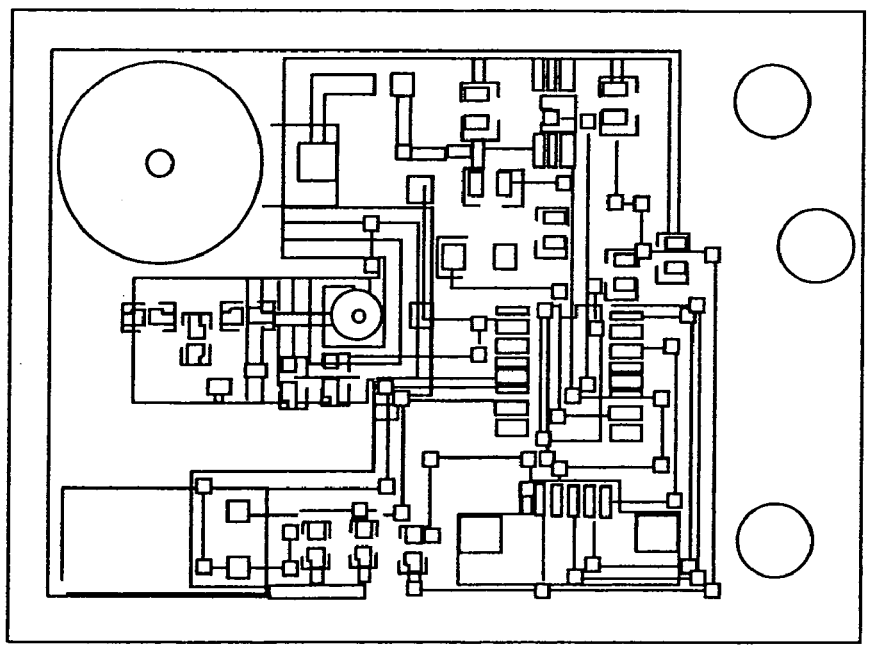

FIGS. 16a–16b provide an illustration of the two type of feed from the antenna, i.e., (a) the micro-strip line feed and (b) the probe feed.

Figure 17:
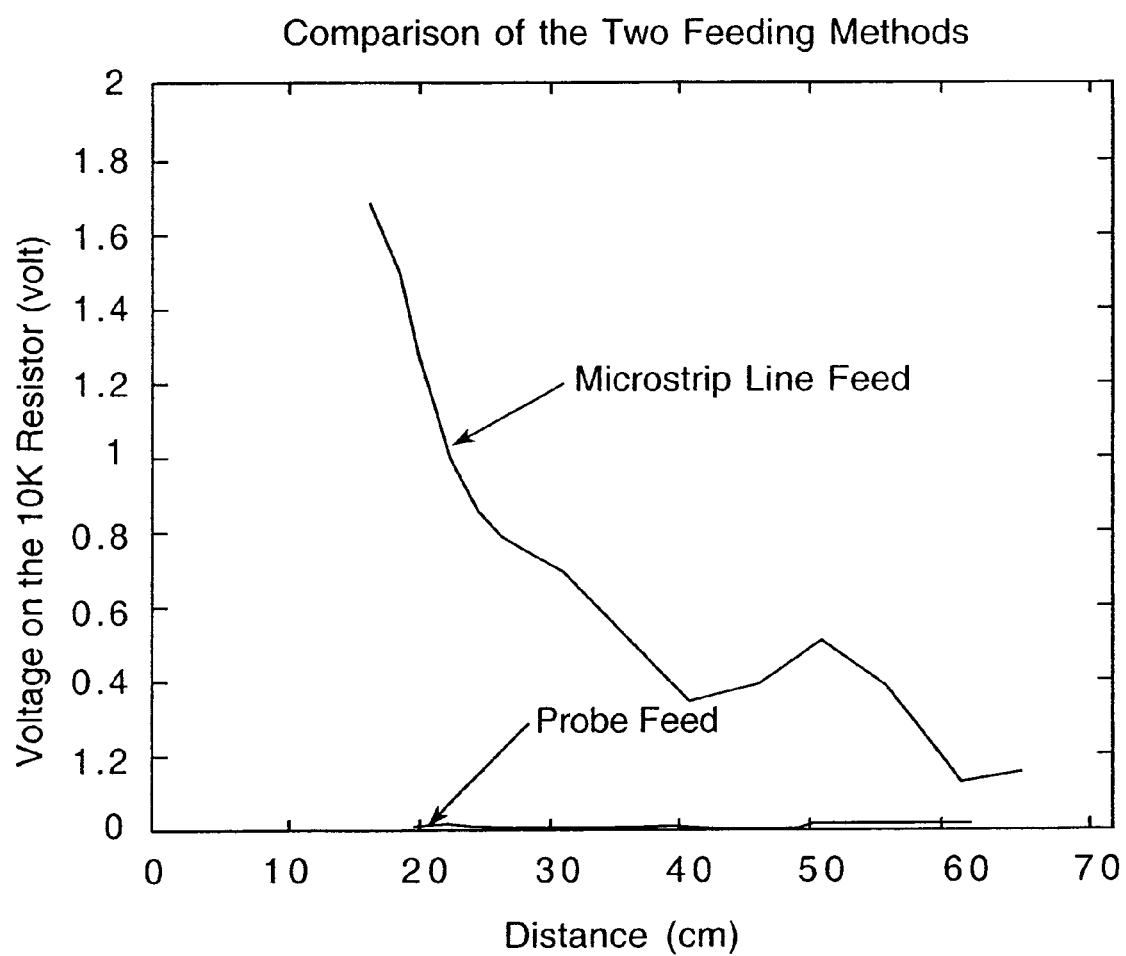
FIG. 17 is a plot of voltage versus distance for the two feed lines of FIGS. 16a–16b.

The voltage results of the two type of line feeds are shown in FIG. 17 where it is quite clear that the preferred type of connection to the antenna is the micro-strip line feed.

(G) Ground Plane Existence

In many applications of different antenna profiles such as a patch, it is desirable to provide a ground plane that is separated from the antenna by a distance that can be calculated based on the dielectric constant of the medium between the ground plane and the antenna. However, it the case of a PCB or CMOS die implementation, the distance between the antenna and the potential location of the ground plane and the dielectric constant of the intervening medium are both fixed by the process independent of the antenna design. Thus, as a rule, the resulting ground plane is not located at the proper position for the fixed dielectric, or the dielectric is incorrect for the position of the ground plane.

Figure 18A:
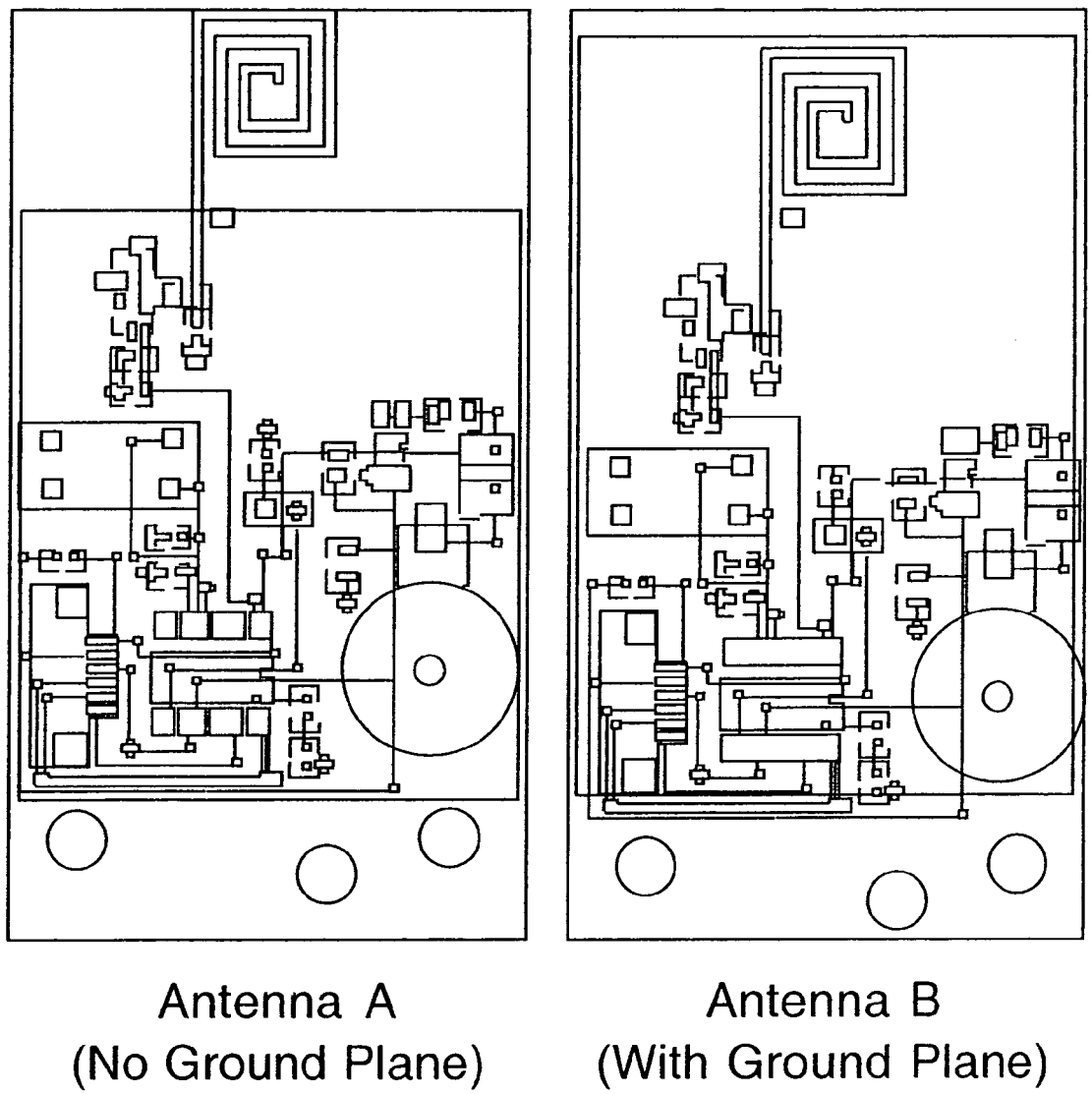
FIGS. 18a–18b illustrate several antennas with respect to ground plane variations.
Figure 18B:
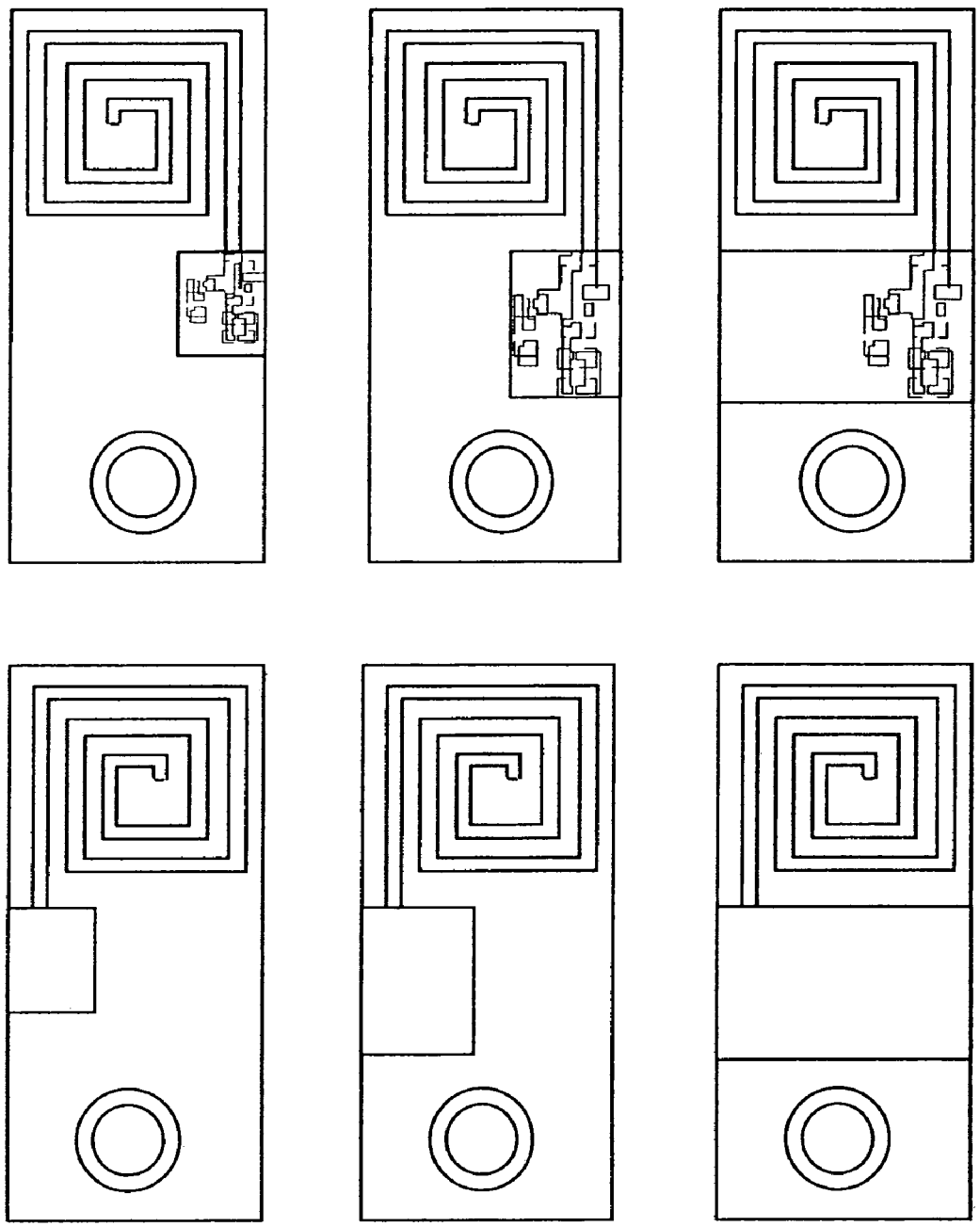
Figure 19:
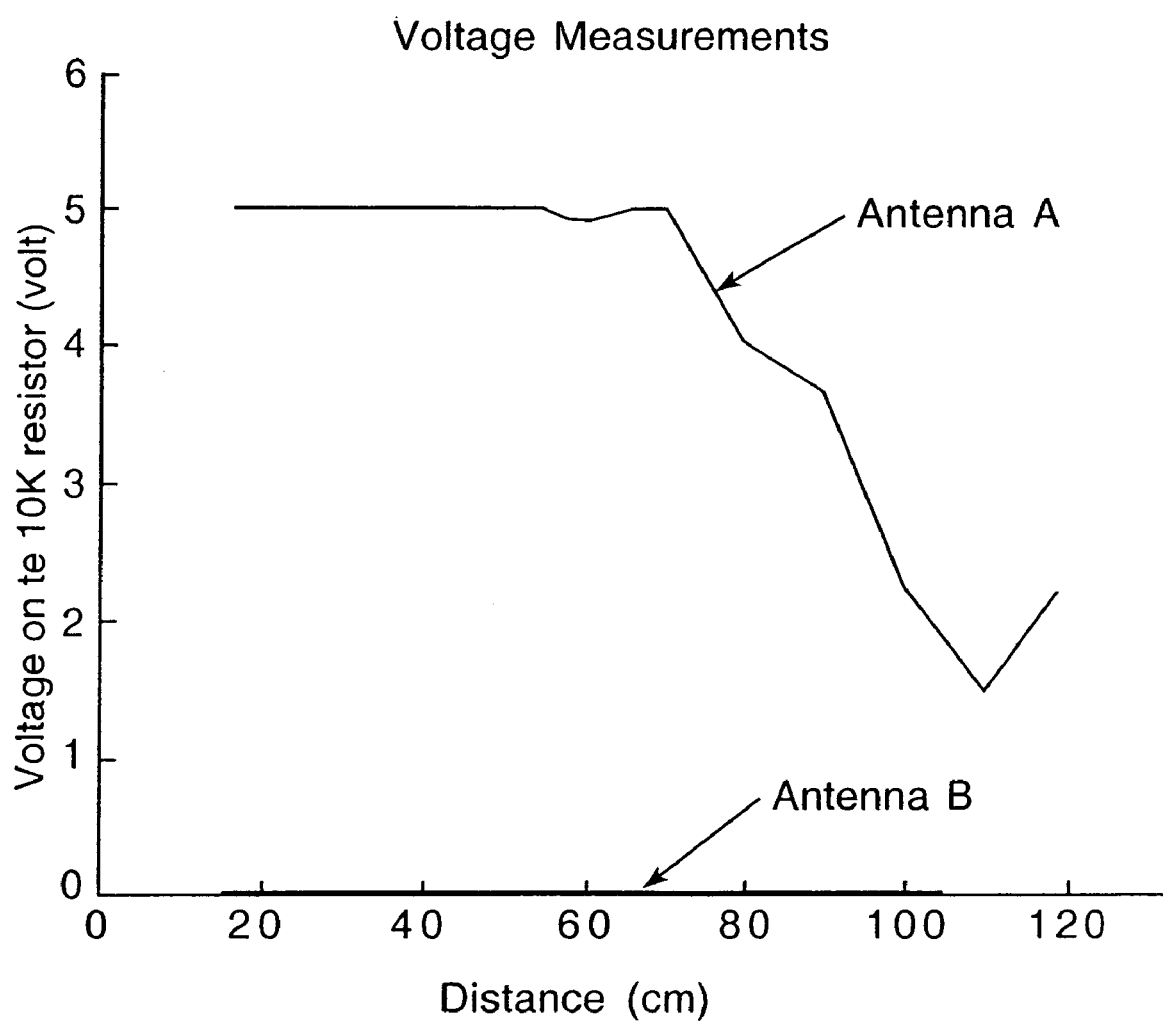
FIG. 19 illustrates a plot of distance versus voltage for some of the antennas of FIGS. 18a–18b.

The current PCB experiments included provisions for testing the ground plane existence and the net effect of some form of a ground plane in the proximity of the antenna. Two types of ground plane experiments are illustrated in FIGS. 18a–18b. The first is a conventional ground plane directly behind the antenna, and the second is a ground plane in the proximity of the antenna on the opposite side of the PCB. The corresponding voltage measurements for the case of FIG. 18a are shown in FIG. 19. The results for the three cases illustrated in FIG. 18b were indistinguishable.

Based on FIGS. 18a–18b, it is clear that the ground plane is not a desirable feature for the PCB implementation. As a curious note, it would be possible to find an antenna/frequency combination for which the ground plane could lead to an advantage. However, such a result would not be practical in view of the restrictions on frequency both from regulatory and power/energy considerations.

As noted previously, the results for the three different sized ground planes illustrated in FIG. 18b were indistinguishable. However, the optimum voltage present in all three cases was the result of different physical impedance matching of the three antennas. Thus, while the proximate ground planes of FIG. 18b do not affect antenna performance, they do provide an affect on the antenna and feed line impedances.

The conclusion here is that in general, it is not desirable to include a ground plane for a PCB or CMOS die type of antenna. In additional a physical ground effect object in the proximate area may be useful in achieving a certain impedance or impedance match.

(H) Impedance Matching

Figure 20:
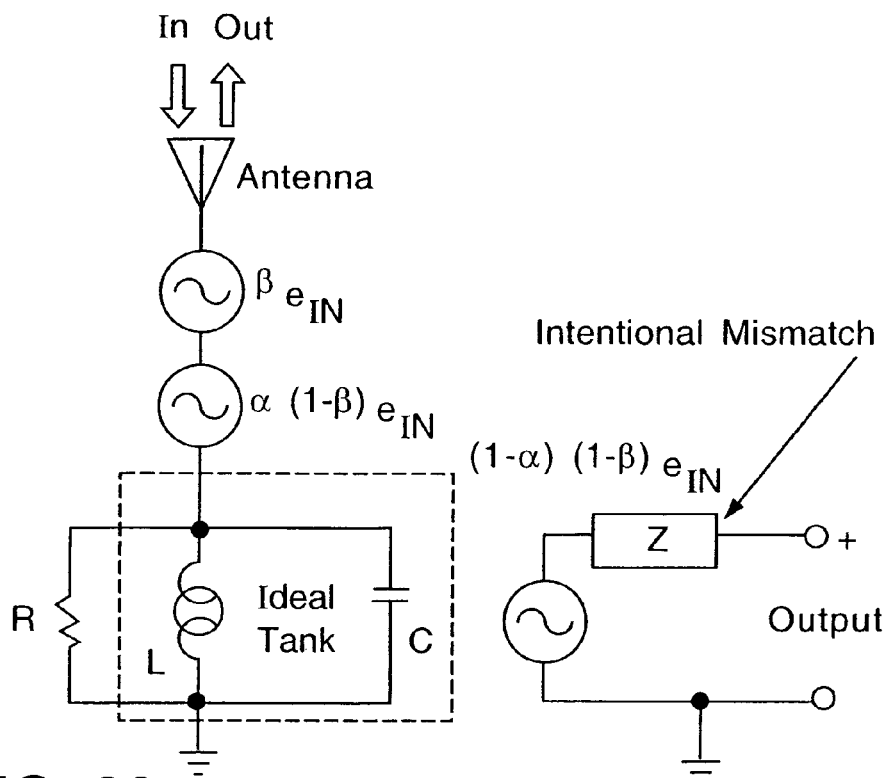
FIG. 20 illustrates a circuit in terms of impedance matching elements.

As indicated previously, it is in general desirable to match the impedance of the antenna to the impedance of the load as complex conjugates. However, in the case of the use of an antenna for the sole purpose of energy harvesting, there is reason to believe that another form of matching or designed mismatching may not be of an advantage. Consider the model of an energy harvesting antenna as shown in FIG. 20. As reported by Rudenberg, the antenna forms a non-ideal tank that has a nonzero resistance. This resistance results in a retransmission of some of the incoming energy that in turn interferes with the transmitted field resulting in an increased effective area of the antenna.

As a result of this research, it is conjectured that an additional amount of retransmitted energy may be of an advantage in disturbing the field to provide an even larger effective area. It is recognized that this increased effective area is not without limit.

The Rudenberg retransmitted energy is a function of the resistance R shown in the tank circuit of FIG. 20. We conjecture that in addition, the intentional mismatch of the impedance Z of FIG. 20 can result in increased effective area.

The effective area increase by the resistor, R, of the tank in FIG. 20, will be referred to as the Rudenberg effective area. The increased effective area caused by the mismatch of Z and the resulting reflected energy from the load is termed the proximate effective area.

The net effect of these two effective area contributions is modeled as two voltage sources just below the ideal antenna symbol of FIG. 20.

Figure 21:
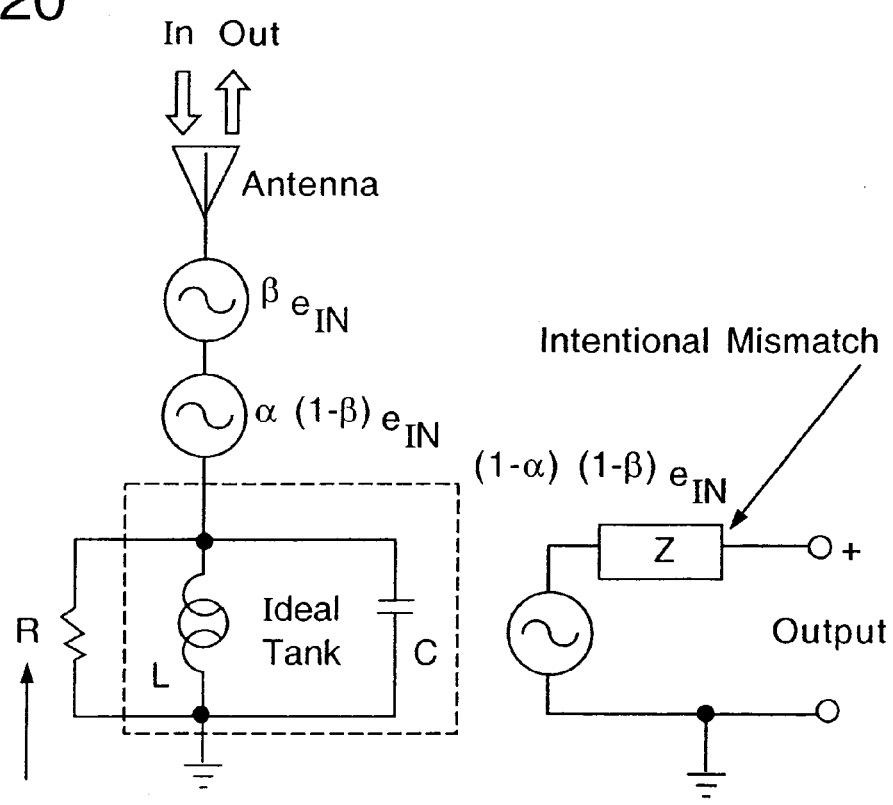
FIG. 21 illustrates the circuit of FIG. 20 with impedance related markings.

These two features contributing to the effective area are highlighted in FIG. 21.

The basis of the conjecture on the mismatch of the impedance Z resulting in reflected energy from the load is arrived at from the repeated attempts to correlate the simulated results for impedance matching with the experimental results found when actually choosing an impedance to increase the harvested energy/voltage experimentally. The results of the simulation and experimental impedance matching are shown in FIGS. 22 and 23.

Figure 22:
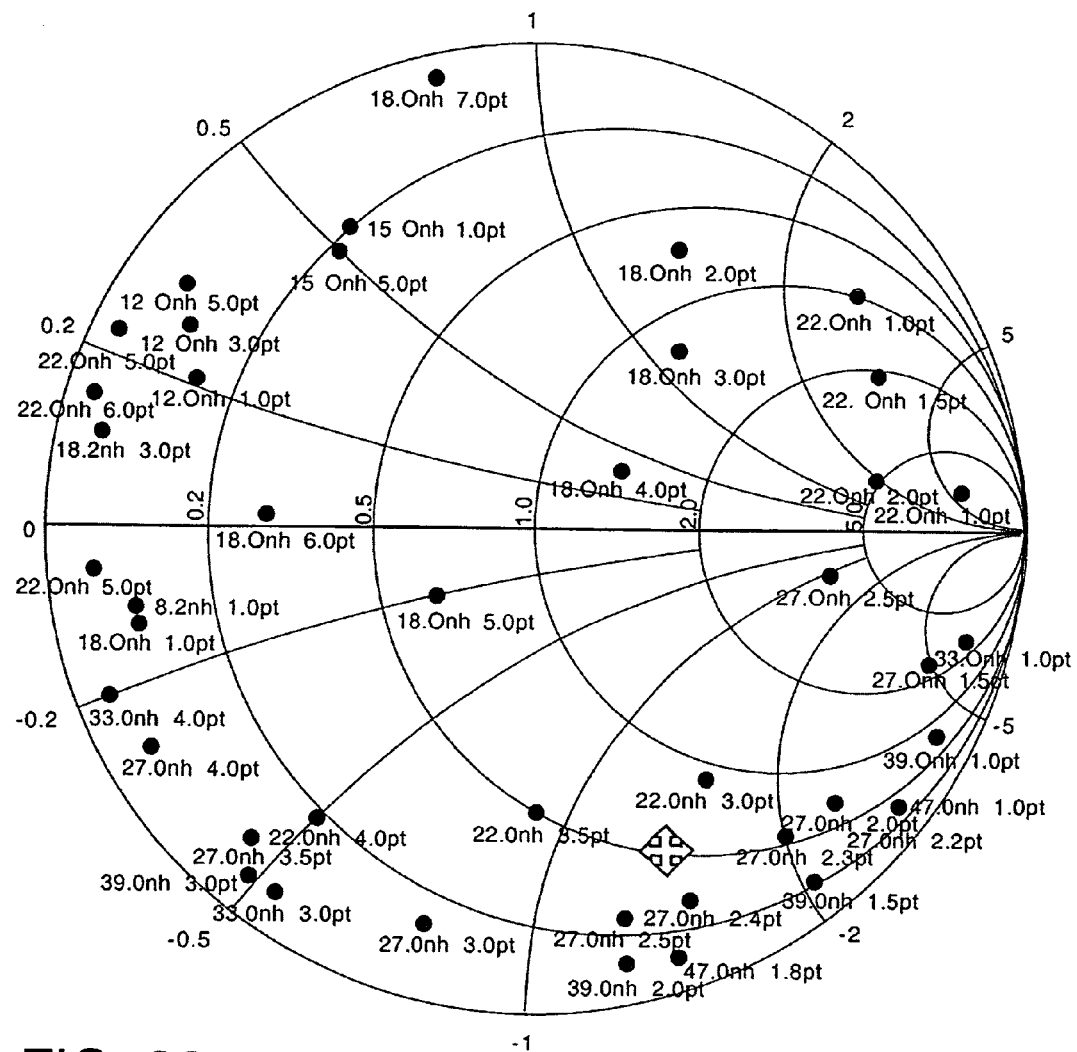
FIGS. 22 and 23 illustrate, respectively, experimental and simulated impedance matching plots.

FIG. 22 represents the compiled voltage results with many different values of impedance used to obtain the most effective match through an organized searching procedure. The N/S/E/W cross of FIG. 22 represents the centroid of the four best matches that could be achieved by physical matching using electronic elements.

Figure 23:
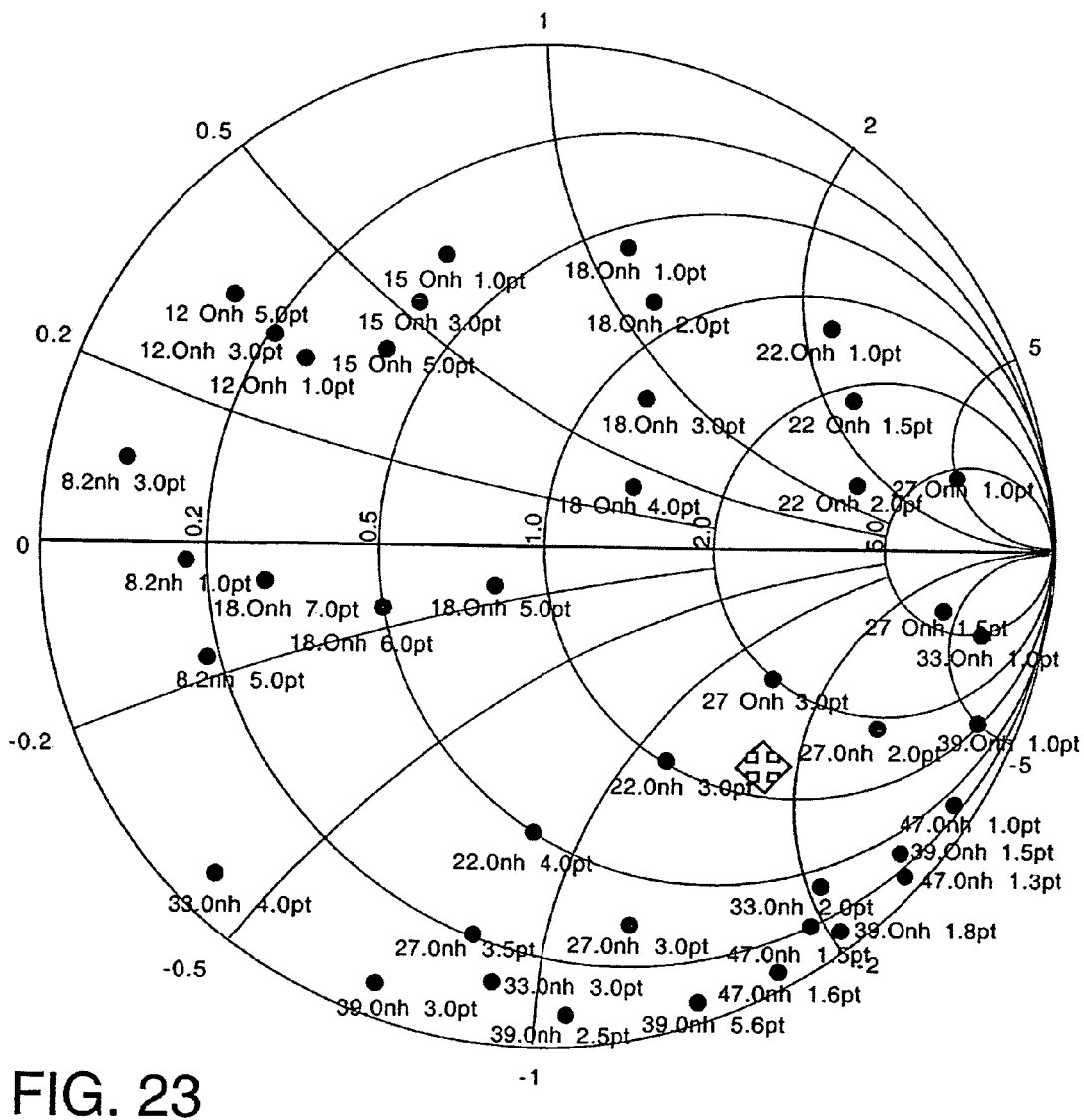

FIG. 23 represents the compiled values of matched impedance along with color coding for strength. The cross of FIG. 23 represents the centroid of the four best matches for the simulations. It is important to note that the simulation may obviously in general not represent the actual circuit due to minute differences that are extremely hard to model. However, numerous attempts were made to calibrate the simulation based on the model and the corresponding test results. However, none of these was successful.

Thus, at this time, the difference in the simulated matching of FIG. 23 based on the complex conjugate impedances and the actual best match in the physical tests is attributed to the mismatching of the impedance z in FIG. 21. There would be a limit on the effectiveness of this mismatch.

As pointed out previously, the two voltage sources shown in FIGS. 22 and 23 immediately below the ideal antenna symbol are attributed to the retransmission of the energy as a result of the R in the non-ideal tank and the reflected energy from the load due to the mismatch of the impedance Z.

CONCLUSIONS

One of the important aspects of this research is the ability to empirically evaluate the feasibility of certain results that require much additional research other than the antenna. For example, consider a system on a chip (SOC) implementation that requires other circuitry to be designed that will in turn be powered by the energy harvesting technology being discussed here. A considerable amount of work may be required to develop the payload circuitry, and it is desired to have some idea of what level of power can be achieved.

Figure 8:
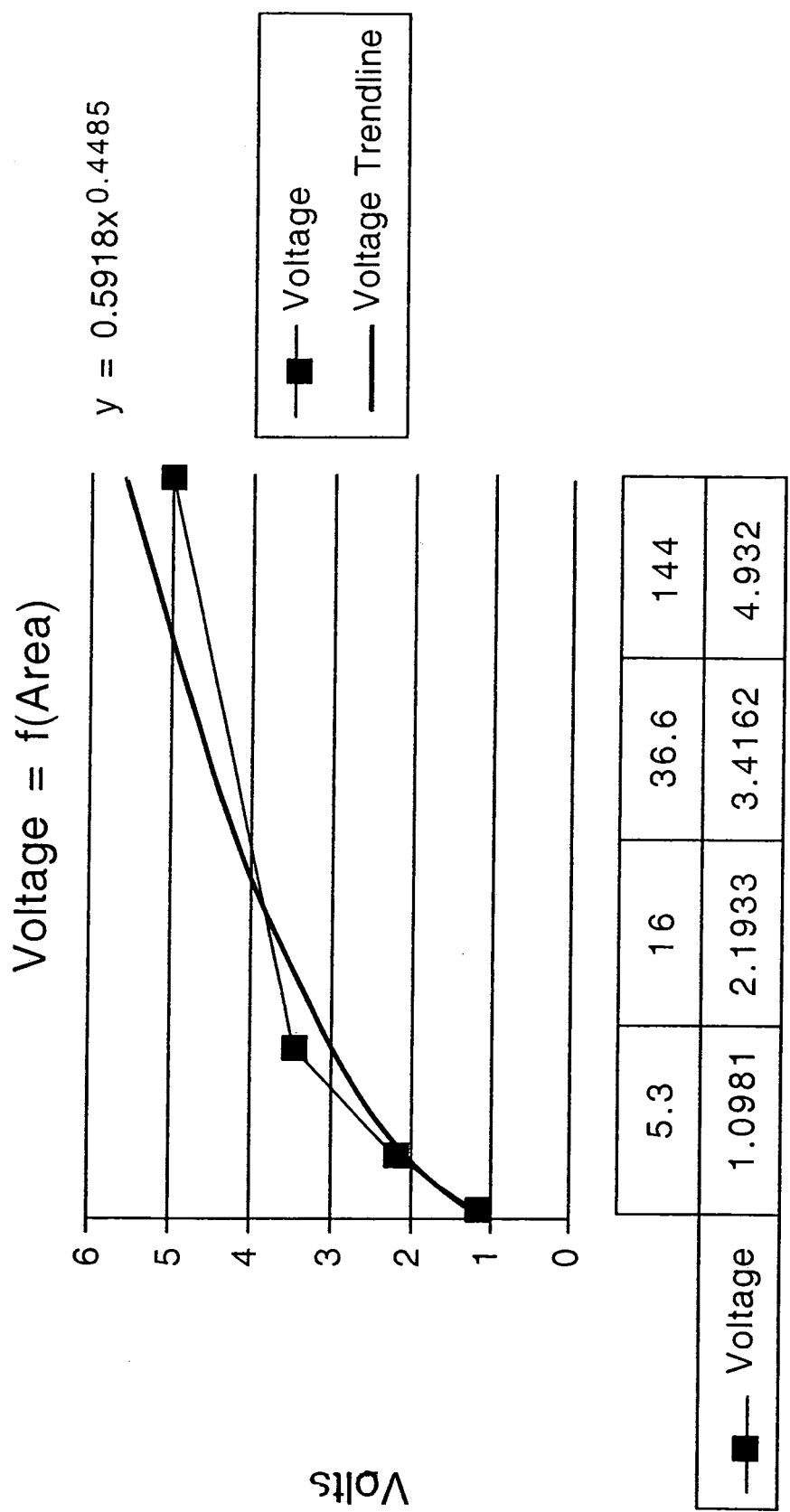
FIG. 8 is a plot of voltage harvested at load for a harvesting distance of 50 cm.

FIG. 8 gives the trend line for the harvested voltage across a 10K ohm load. Therefore, with an antenna that is 1.58 mm on a side, the power that can be expected to be harvested with the thickness of antenna A is:

Power={[$O$.5918*(1.582)$J0$~~85]2}/104=80 $j.t$ watts

However, based on the narrower and thinner trace, the voltage can be expected to be at least doubled. This would result in:

Power={[2*0.591 8*(1.582)]04485]2}/104=178 $j.i$ watts

The results appear to show that the highest voltage is achieved with a narrower and thinner conductor trace. This is not unexpected from the energy harvesting scenario. At the frequencies involved, the current tends to flow on the outside surface with possible eddy current flowing in the interior that will contribute losses.

Consider reducing only the width of the traces. The PCB traces are on the order of 700 to 1300 microns. A plot of the data for the slope in the linear fall off($y=-Mx+b$, M is the linear fall off or slope of the trend line) as shown in FIG. 7 for antennas A, B and C is shown in FIG. 24$a$.

The point of this discussion is solely to see the fall off rate for the harvested energy as the antenna trace pattern is reduced in width. The trend lines of FIG. 10, for example, have both a slope and a y intercept, M and b in the above equation for y. The discussion here concerns solely the slope, M, of the trend line. The y intercept appears to be primarily a function of the antenna area and is outside this current discussion.

Figure 24A:
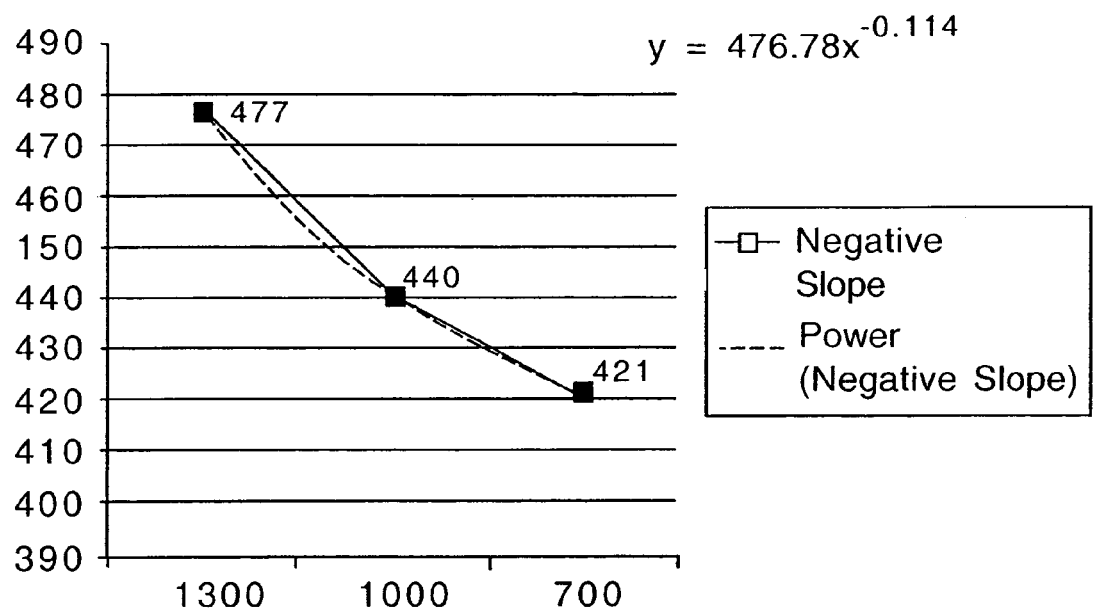
FIGS. 24a–24b illustrate, respectively, plots of PCB data points and a projection of the same to about 25 mm.
Figure 24B:
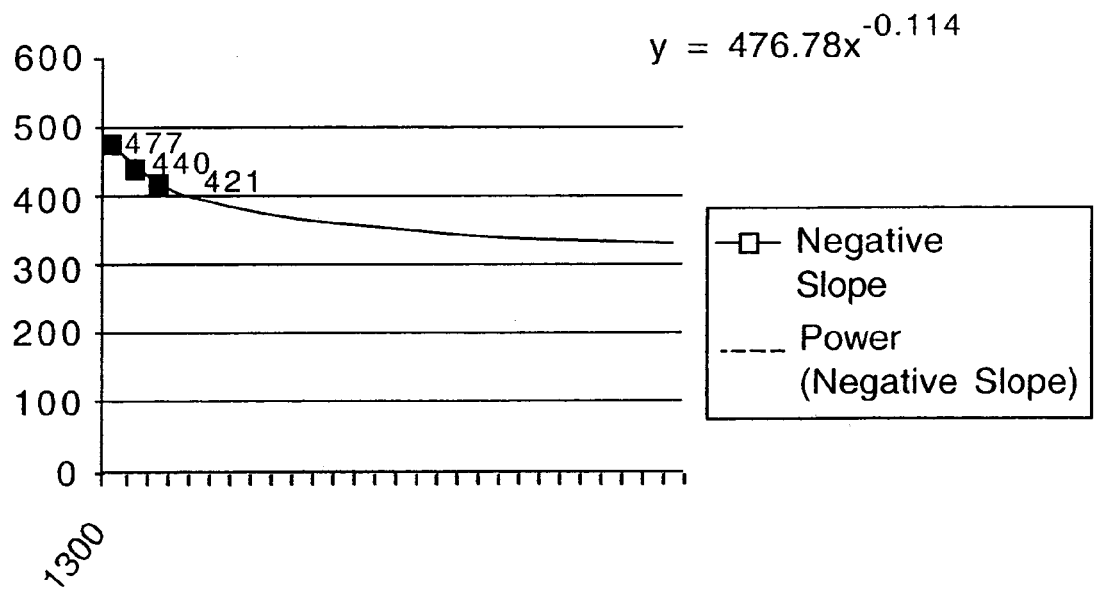

Based on the projection shown in FIG. 24$b$, the fall off rate in energy is, −0.0328, compare with, −0.0421, for Antenna B as the antenna trace width is reduced to 25 microns.

Thus, based solely on the projection in FIG. 24$b$, the rate improvement of the fall off in going to a CMOS die from a PCB implementation is about 22%. Therefore, in general, it can be expected that the deterioration in performance for a CMOS die will be much better (less per unit distance) than a PCB implementation as the distance between the source and device increases.

Figure 25:
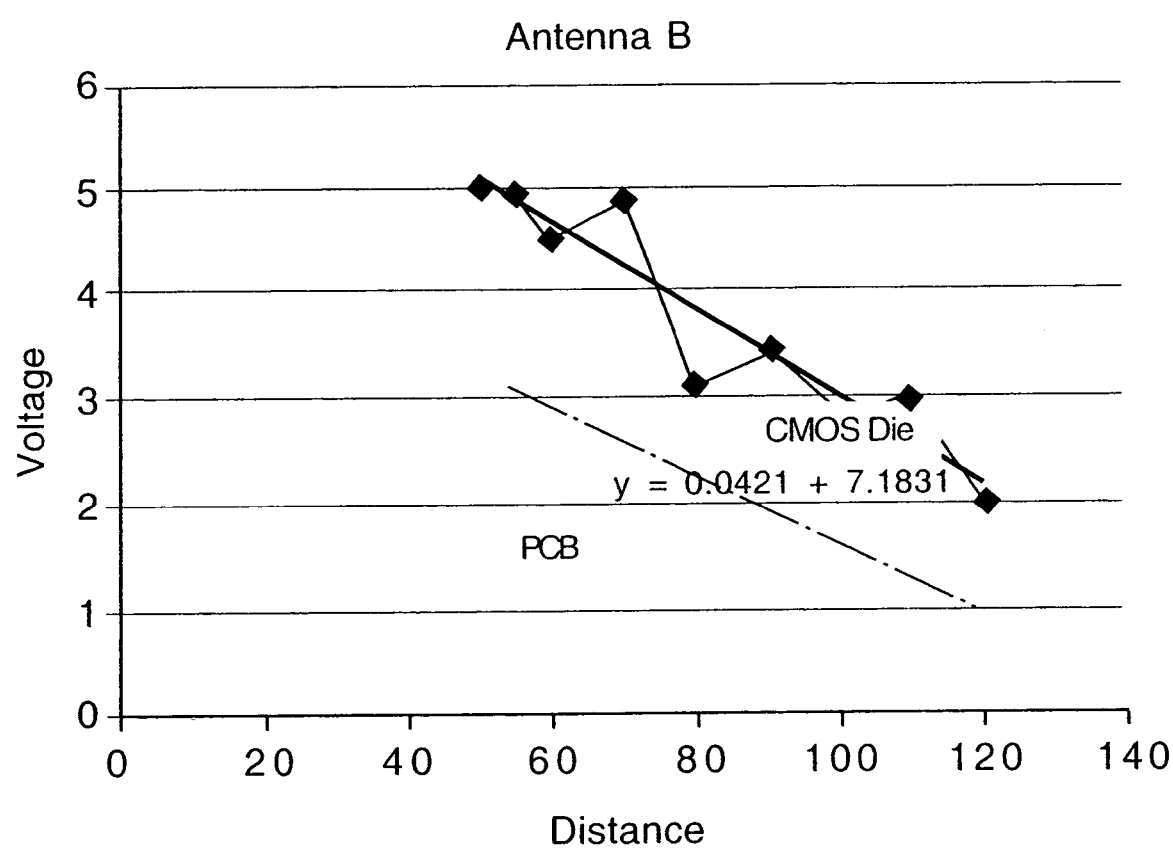
FIG. 25 shows plots of voltage versus distance for PCB and CMOS traces.

An example of the effect of this difference can be seen in FIG. 25, assuming the intercept point that would make the harvested voltages at 50 centimeters to be the same.

Figure 26A:
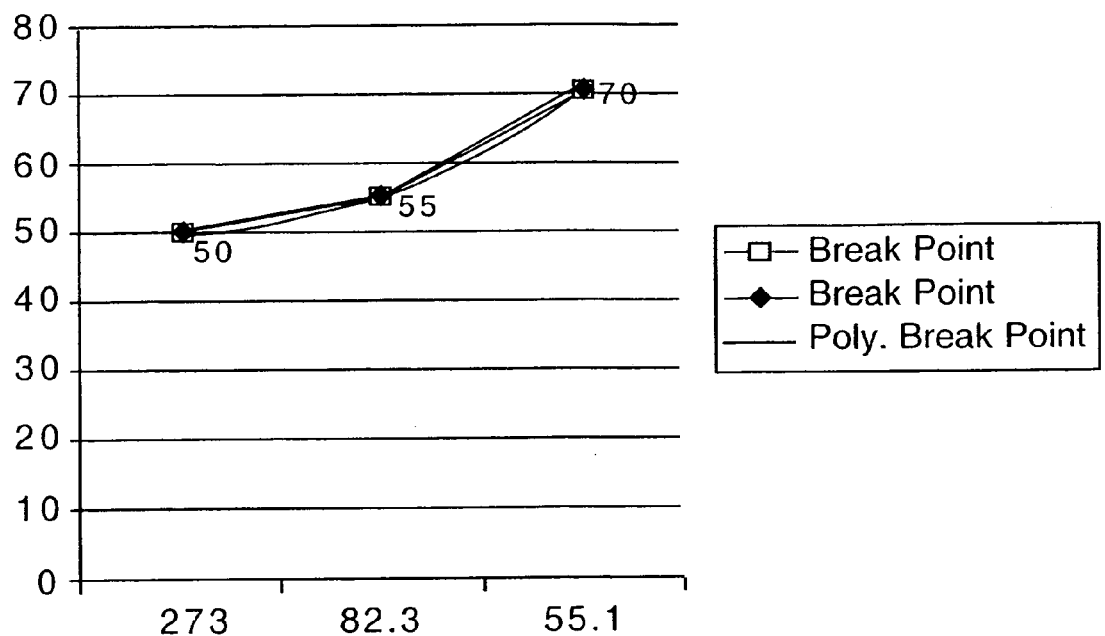
FIGS. 26a–26b show, respectively, plots of original data for copper and extrapolation of the same in respect of thickness.
Figure 26B:
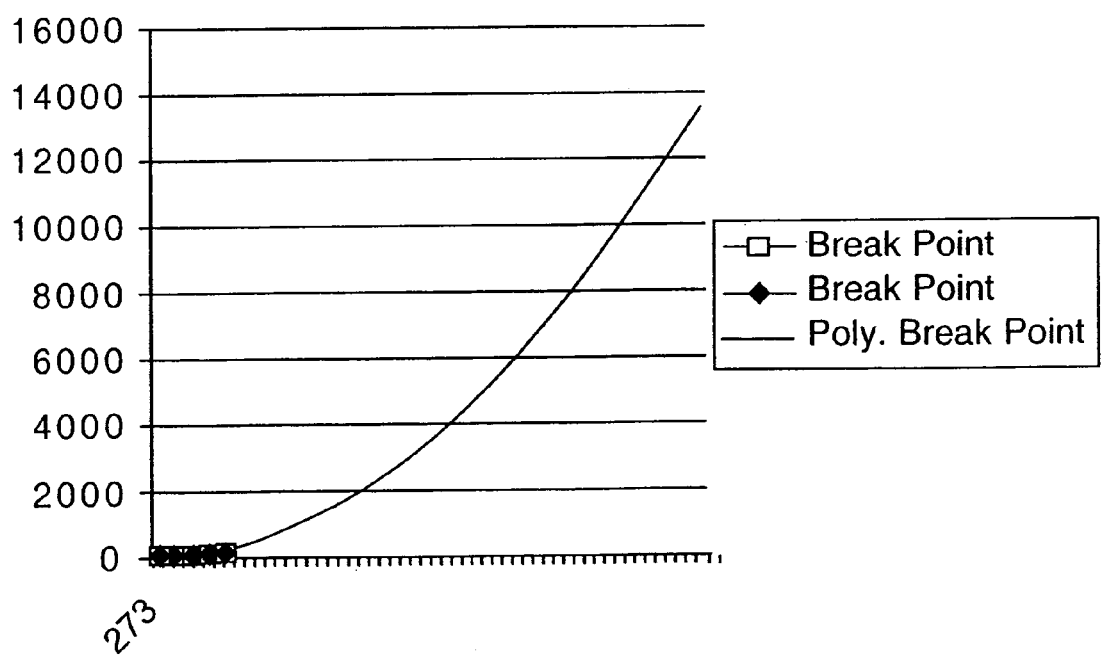

Another interesting look at the projections in going from PCB antennas to those of a CMOS die can be obtained by considering the thickness results from FIG. 13$b$. The results of the decrease in thickness are shown below in FIG. 26$a$. Based on the trend line fitted to these data points, an extrapolation to approximately 1 micron is shown in FIG. 26$b$. f it can be assumed that both the PCB and the CMOS die have the same value at say 50 centimeters, it can be conjectured that the break point as shown in FIG. 14$b$, can be extended to 13,600 centimeters or 446 feet.

Obviously the simple extension to 446 feet from 70 centimeters is difficult to defend. The point here is that there are certain of the parameters in the design of the antenna that must be taken into account that provide direction into the experimental development that will eventually produce a working result although the theory as to why may be delayed by a considerable time.

There is no suggestion, other than the extrapolation, that the 446 feet can be achieved. This result is for copper, and most current fabrications are done with aluminum.

One major conclusion of these results is that the transition from a PCB implementation to a CMOS die need not be considered to be an unfavorable transition.

The primary reduction in the PCB to CMOS die transition is the attendant desire to reduce area because of the relative cost of a PCB compared to a CMOS die per unit (equivalent) area.

All of the previous results were obtained with the antennas in the same orientation with respect to the source antenna. In order to evaluate the orientation issue, FIG. 27 shows six orientations that were tested.

Figure 28:
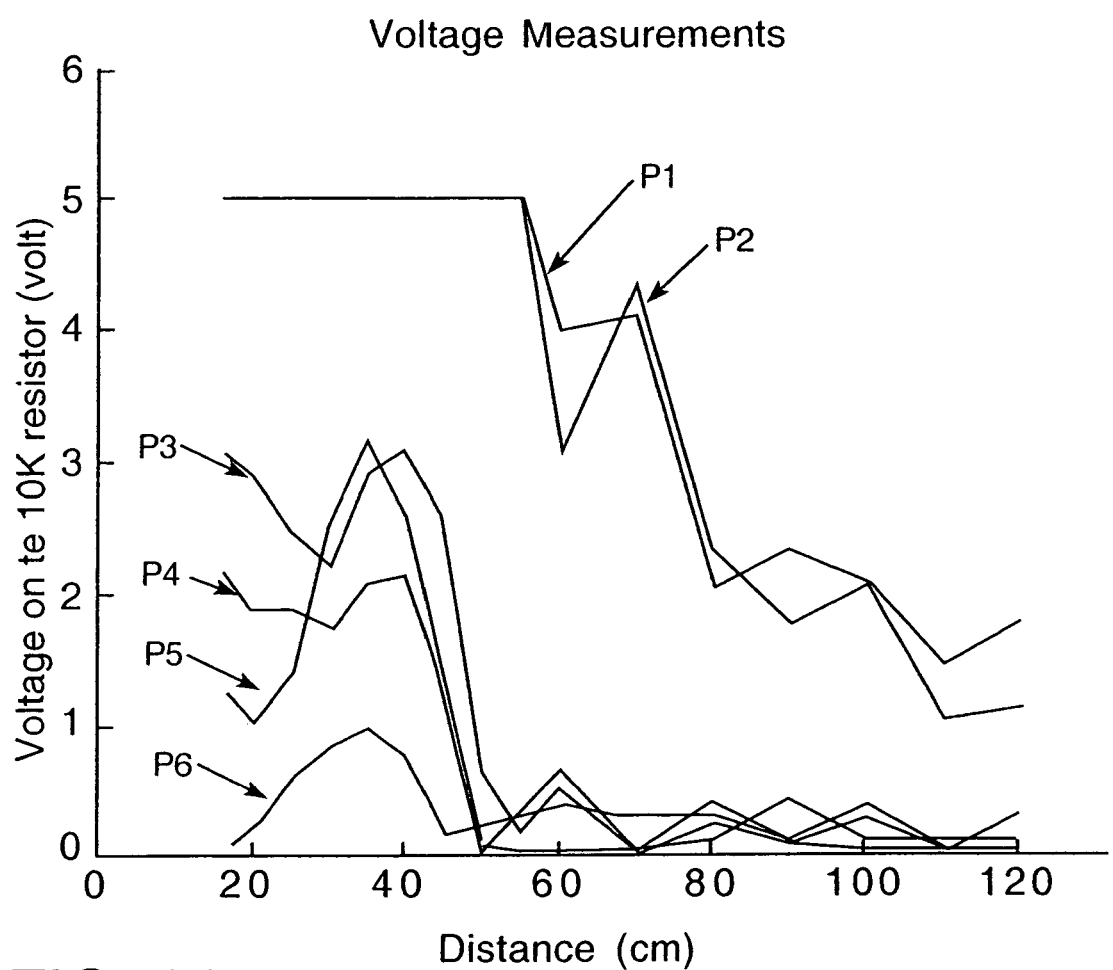
FIG. 28 is a plot of voltage versus distance for the orientations of FIG. 27.

The voltage as a function of distance curves for the six configurations are shown in FIG. 28. Obviously, the most favorable positions are positions 1 and 2. Position 1 is the position that was used for all of the previous results. The two orientations, 5 and 6, are included for the sake of completeness. However, these two are not at all favorable. One reason for their inclusion was that these two were quite favorable in the early tests on the Delta 1 CMOS antenna. At this time there has been no attempt to discover why the PCB and CMOS results for the horizontal antenna appear to be different.

Figure 29:
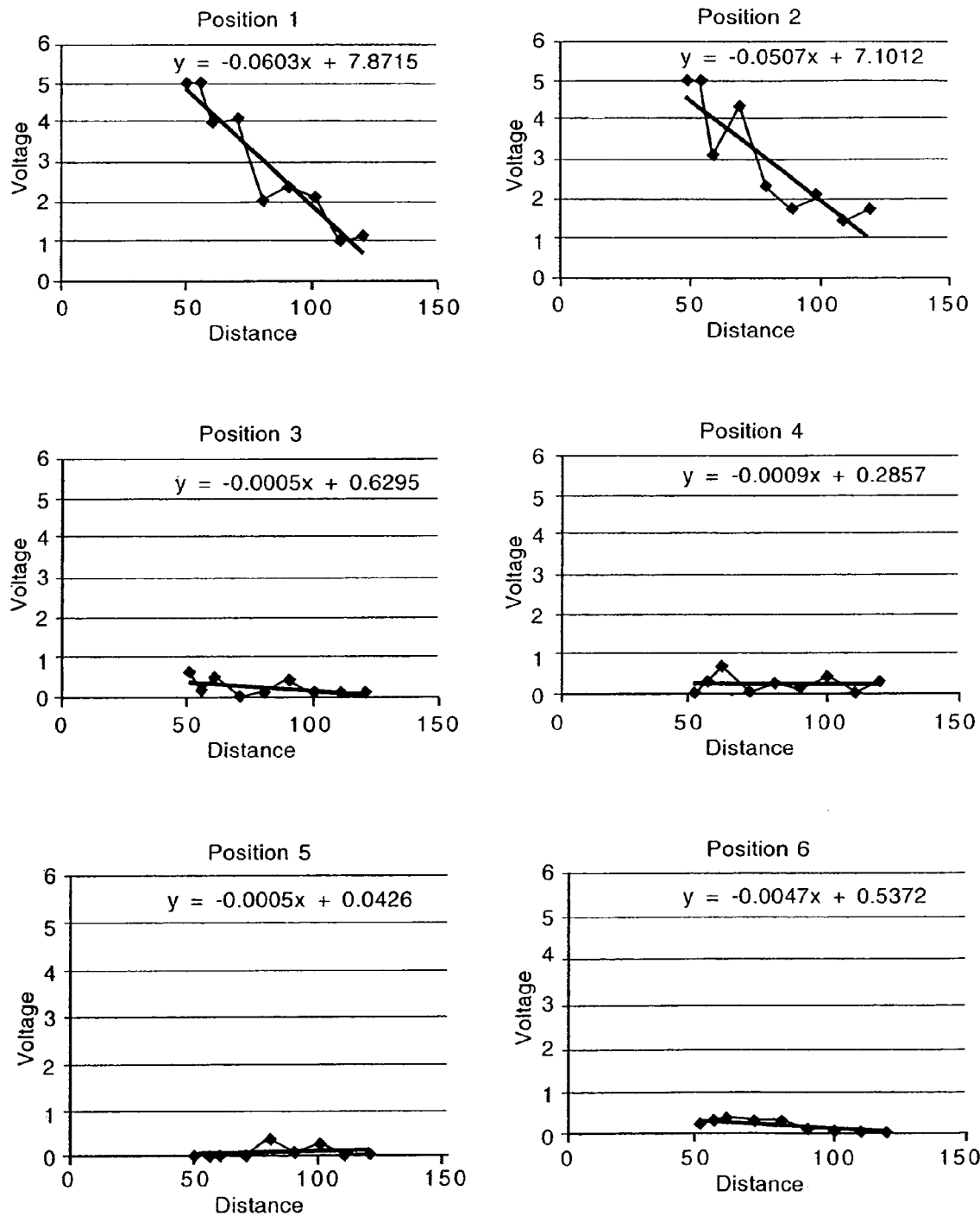
FIG. 29 shows trend lines for the six plots of voltage versus distance as related to FIG. 27.

The trend lines for the curves of FIG. 28 are given in FIG. 29. From the trend lines, position 1 is the best in terms of the y intercept. However, the fall-off rate for position 2 is the best for the two positions. If we consider the longest distance for a typical PIC microcontroller to function based on 2.5 volts, Position 2 yields 90.8 centimeters and Position 1 yields 89.1 centimeters. These two results are extremely close based on the trend lines.

Figure 30:
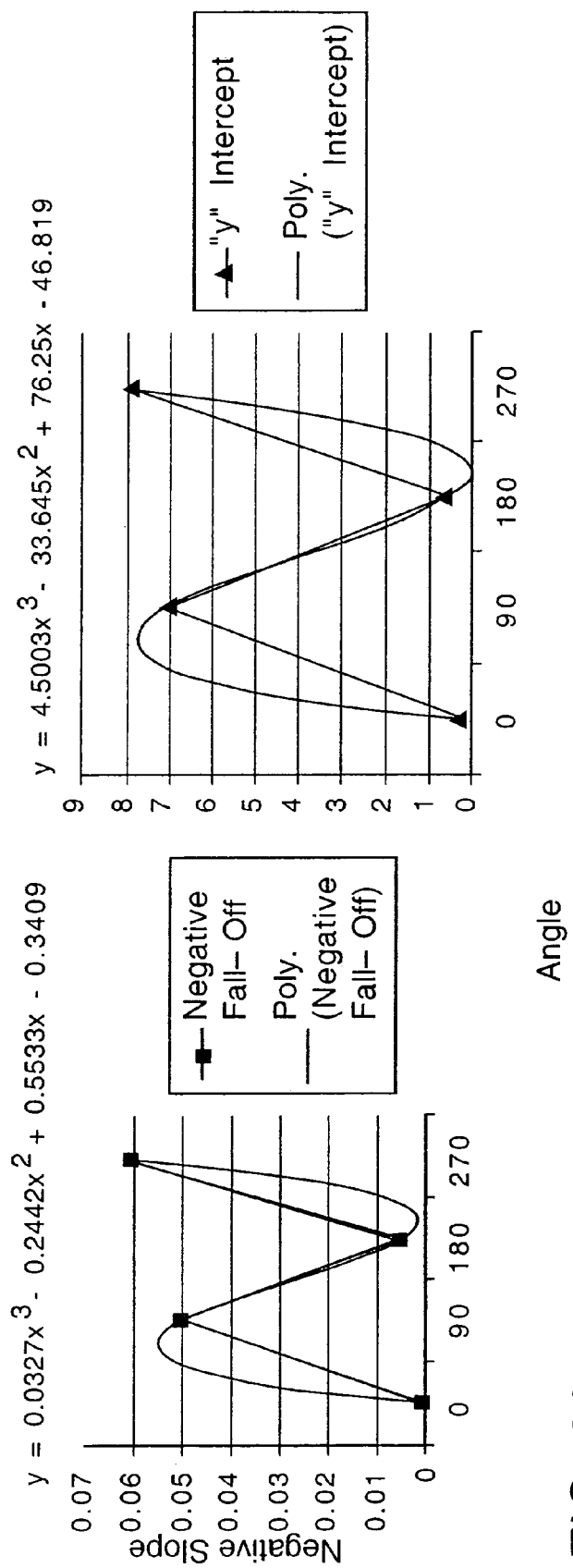
FIG. 30 shows the negative slope and y intercept of the trend lines.

The negative slope and the y intercept of the trend lines is shown below in FIG. 30. The angle shown along the abscissa is the feed line of the micro-strip type feed where the angle is from the feed line in the direction of the load circuitry. In FIG. 27, P4 is 0 degrees, P2 is 90 degrees, P4 is 180 degrees, and P1 is 270 degrees.

Based on the results reported here, the conclusions are summarized as follows:
1. Impedance matching is essential but does not guarantee optimum performance for a fixed area of a small antenna
2. A ¼ wavelength antenna appears to be the optimum antenna for a fixed area
3. The area appears to be the most important factor—given 1 and 2
4. The spiral antenna profile is preferred because it is much easier to match impedances
5. The narrowest trace (width) appears to be optimum
6. The thinnest trace (height) appears to be optimum
7. Increased conductor length does not appear to offer any benefit for energy harvesting
8. The micro-strip line feed is superior to the probe feed
9. There should be no ground plane under the antenna
10. The square spiral is preferred to the square patch based on impedance matching considerations
11. Both tank resistance and reflected load power due to mismatched impedances appear to increase the effective area of the small antenna While for convenience of disclosure primary attention has been directed toward use of the preferred embodiments of the invention which employ IC chips or printed circuit boards, the invention may also be employed advantageously in connection with other substrates in wireless untethered devices.

Whereas particular embodiments of the invention have been disclosed herein for purposes of illustration, it will be evident to those skilled in the art that numerous variations of the details may be made without departing from the invention as set forth in the appended claims.

The invention claimed is:

1. A wireless untethered device comprising:
at least one antenna;
circuitry operatively associated with said antenna for receipt of energy harvested by said antenna from space, said circuitry being structured to convert said energy to direct current; and
a system structured to be energized by the direct current from said circuitry, said system and said circuitry having an impedance mismatch with respect to said antenna wherein said antenna, said circuitry and said system together form an integrated antenna and wherein said antenna has an effective area greater than its physical area.

2. The wireless untethered device of claim 1 including
said wireless untethered device being selected from the group consisting of an integrated circuit chip and a printed circuit board.

3. The wireless untethered device of claim 1 including
said wireless untethered device being an integrated circuit chip.

4. The integrated circuit chip of claim 3 including
said antenna being integrally formed on said chip.

5. The integrated circuit chip of claim 4 including
said antenna structured to receive RF energy and deliver it to said circuitry.

6. The integrated circuit chip of claim 4 including
a second integral antenna for transmitting data.

7. The integrated circuit chip of claim 4 including
said antenna being a spiral antenna.

8. The integrated circuit chip of claim 7 including
said spiral antenna being a square spiral.

9. The integrated circuit chip of claim 3 including
said circuitry having a tank circuit for increasing the effective area of said antenna.

10. The integrated circuit chip of claim 5 including
said antenna having a length of about ¼ wavelength of said RF energy.

11. The integrated circuit chip of claim 3 including
a micro-strip feed line connected to said antenna.

12. The integrated circuit chip of claim 3 including
said circuitry having a non zero resistance which results in retransmission of some of said energy to thereby interfere with transmitted energy and increase the effective area of said antenna.

* * * * *

UNITED STATES PATENT AND TRADEMARK OFFICE
CERTIFICATE OF CORRECTION

PATENT NO.        : 7,057,514 B2
APPLICATION NO. : 10/857527
DATED             : October 5, 2004
INVENTOR(S)       : Marlin H. Mickle, Christopher C. Capelli and Harold Swift It is certified that error appears in the above-identified patent and that said Letters Patent is hereby corrected as shown below:

Column 4, line 46, "tern" should be changed to --term--.

Column 8, line 30, "do" should be changed to --due--.

Column 8, line 57, "what" should be changed to --that--.

Column 9, line 56, "place" should be changed to --placed--.

Column 10, line 5, "in" should be changed to --are--.

Column 10, line 39, "that" should be changed to --than--.

Column 11, line 11, the word "where" should be inserted after the word --accomplished--.

Column 11, line 60, "it" should be changed to --in--.

Column 11, line 48, "type" should be changed to --types--.

Column 11, line 51, "type" should be changed to --types--.

Column 12, line 24, "affect" should be changed to --effect--.

Column 12, line 28, "additional" should be changed to --addition,--.

UNITED STATES PATENT AND TRADEMARK OFFICE
CERTIFICATE OF CORRECTION

PATENT NO. : 7,057,514 B2
APPLICATION NO. : 10/857527
DATED : October 5, 2004
INVENTOR(S) : Marlin H. Mickle and Christopher C. Capelli and Harold Swift It is certified that error appears in the above-identified patent and that said Letters Patent is hereby corrected as shown below:

Column 12, line 32, "in general" should be changed to --generally--.

Column 14, line 29, "f" should be changed to --If--.

IN THE FIGURES

FIGS. 7, 19 and 28, "te" should be changed to --the--.

Signed and Sealed this

Fourteenth Day of November, 2006

JON W. DUDAS
*Director of the United States Patent and Trademark Office*

UNITED STATES PATENT AND TRADEMARK OFFICE
CERTIFICATE OF CORRECTION

PATENT NO. : 7,057,514 B2
APPLICATION NO. : 10/857527
DATED : June 6, 2006
INVENTOR(S) : Marlin H. Mickle, Christopher C. Capelli and Harold Swift It is certified that error appears in the above-identified patent and that said Letters Patent is hereby corrected as shown below:

Column 4, line 46, "tern" should be changed to --term--.

Column 8, line 30, "do" should be changed to --due--.

Column 8, line 57, "what" should be changed to --that--.

Column 9, line 56, "place" should be changed to --placed--.

Column 10, line 5, "in" should be changed to --are--.

Column 10, line 39, "that" should be changed to --than--.

Column 11, line 11, the word "where" should be inserted after the word --accomplished--.

Column 11, line 60, "it" should be changed to --in--.

Column 11, line 48, "type" should be changed to --types--.

Column 11, line 51, "type" should be changed to --types--.

Column 12, line 24, "affect" should be changed to --effect--.

Column 12, line 28, "additional" should be changed to --addition,--.

UNITED STATES PATENT AND TRADEMARK OFFICE
CERTIFICATE OF CORRECTION

PATENT NO.          : 7,057,514 B2
APPLICATION NO. : 10/857527
DATED                   : June 6, 2006
INVENTOR(S)         : Marlin H. Mickle and Christopher C. Capelli and Harold Swift It is certified that error appears in the above-identified patent and that said Letters Patent is hereby corrected as shown below:

Column 12, line 32, "in general" should be changed to --generally--.

Column 14, line 29, "f" should be changed to --If--.

IN THE FIGURES

FIGS. 7, 19 and 28, "te" should be changed to --the--.

This certificate supersedes Certificate of Correction issued November 14, 2006.

Signed and Sealed this

Second Day of January, 2007

JON W. DUDAS
*Director of the United States Patent and Trademark Office*